United States Patent
Spencer

(10) Patent No.: US 11,933,271 B1
(45) Date of Patent: Mar. 19, 2024

(54) VERTICAL AXIS WIND TURBINE WITH ROTATING VANES

(71) Applicant: George A. Spencer, Athens, TX (US)

(72) Inventor: George A. Spencer, Athens, TX (US)

(*) Notice: Subject to any disclaimer, the term of this patent is extended or adjusted under 35 U.S.C. 154(b) by 0 days.

(21) Appl. No.: 18/366,408

(22) Filed: Aug. 7, 2023

Related U.S. Application Data

(63) Continuation-in-part of application No. 18/096,805, filed on Jan. 13, 2023, now Pat. No. 11,795,909.

(51) Int. Cl.
*F03D 3/06* (2006.01)
*F03D 3/00* (2006.01)

(52) U.S. Cl.
CPC .......... *F03D 3/066* (2023.08); *F03D 3/005* (2013.01); *F05B 2260/964* (2013.01)

(58) Field of Classification Search
CPC ..... F03D 3/005; F03D 3/066; F05B 2260/964
See application file for complete search history.

(56) References Cited

U.S. PATENT DOCUMENTS

| | | | |
|---|---|---|---|
| 1,036,109 | A | 8/1912 | Haslinger et al. |
| 3,793,530 | A | 2/1974 | Carter |
| 3,995,170 | A | 11/1976 | Graybill |
| 4,115,027 | A | 9/1978 | Thomas |
| 4,346,305 | A | 8/1982 | White |
| 4,468,169 | A | 8/1984 | Williams |
| 5,332,925 | A | 7/1994 | Thomas |
| 5,951,249 | A | 9/1999 | Aylor |
| 6,320,273 | B1 | 11/2001 | Nemec |
| 6,413,038 | B1 | 7/2002 | Lord |
| 6,857,846 | B2 | 2/2005 | Miller |
| 8,684,817 | B2 | 4/2014 | Walker et al. |
| 8,979,494 | B1 | 3/2015 | Myers |

(Continued)

FOREIGN PATENT DOCUMENTS

| | | |
|---|---|---|
| CA | 2685189 C | 6/2015 |
| GB | 2296048 A | 6/1996 |
| WO | 2006131935 A1 | 12/2006 |

OTHER PUBLICATIONS

Powers, Thomas., "Design of a Retractable Vane for a Vertical Axis Wind Turbine", Olivet Nazarene University Digital Commons @ Olivet, Jul. 29, 2011, pp. 28.

*Primary Examiner* — Brian O Peters

(57) ABSTRACT

A vertical axis windmill turbine comprises a support structure for supporting the vertical axis windmill turbine above ground level. At least one rotor rotates upon the support structure and has a horizontal structure having a rotational axis perpendicular to the ground level. A plurality of blades are positioned within each of the at least one rotor for causing the at least one rotor to rotate on the support structure responsive to wind force. A plurality of vanes are located on each of the plurality of blades and rotate between an open position to limit drag on the at least one rotor and a closed position that provides a rotational force to the at least one rotor. The plurality of vanes rotate between the open position and the closed position of approximately 180°. A plurality of hinges each connect a vane of the plurality of vanes to a blade of the plurality of blades. The plurality of hinges have a biasing force applied thereto to slow movement of the connected vane when approaching 0° and 180°, respectively. A plurality of vane stops associated with each of the plurality of blades prevent the vane from moving past approximately 0° and approximately 180°.

16 Claims, 32 Drawing Sheets

(56) References Cited

U.S. PATENT DOCUMENTS

| | | |
|---|---|---|
| 10,041,478 B2 | 8/2018 | Spencer |
| 2004/0213670 A1 | 10/2004 | Alexander et al. |
| 2008/0292460 A1 | 11/2008 | Kuo et al. |
| 2009/0066088 A1 | 3/2009 | Liang |
| 2009/0097960 A1 | 4/2009 | Williams |
| 2009/0180880 A1 | 7/2009 | Ersoy |
| 2010/0109337 A1 | 5/2010 | Wang et al. |
| 2011/0068581 A1 | 3/2011 | Lowery |
| 2011/0133474 A1 | 6/2011 | Haar |
| 2012/0047976 A1 | 3/2012 | Vanderhye |
| 2012/0121414 A1 | 5/2012 | Steinberg et al. |
| 2017/0241403 A1 | 8/2017 | Spencer |

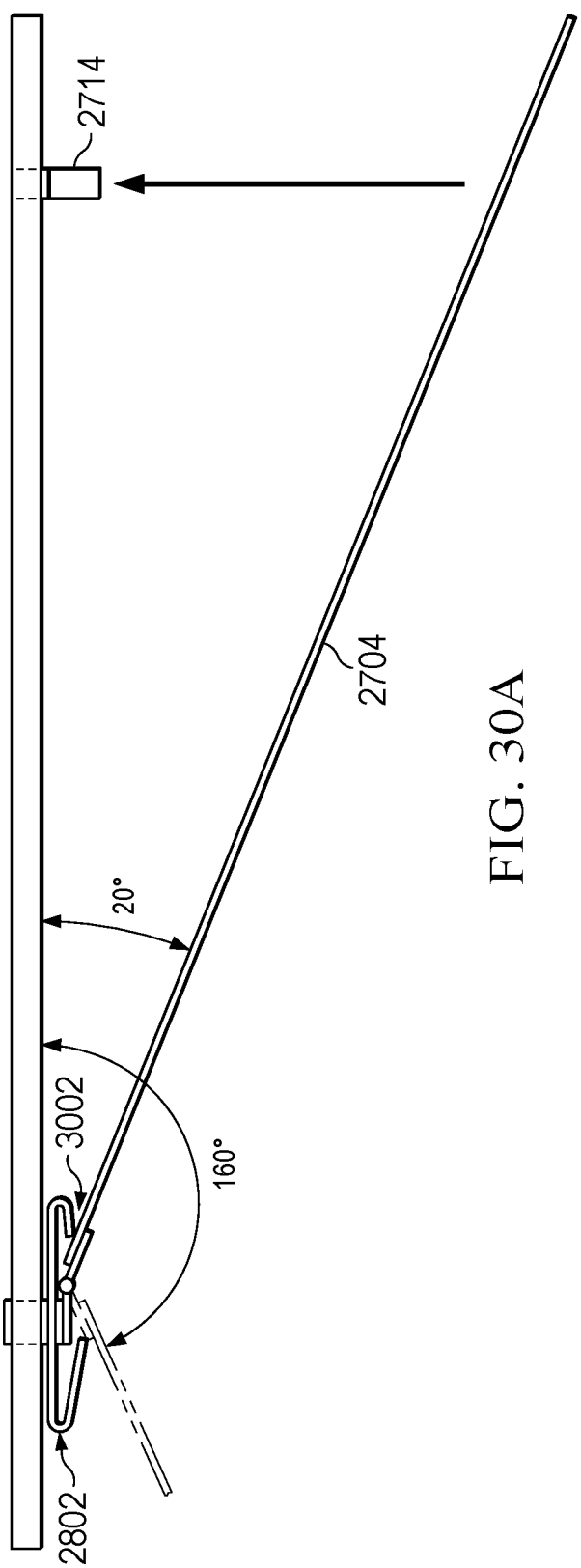

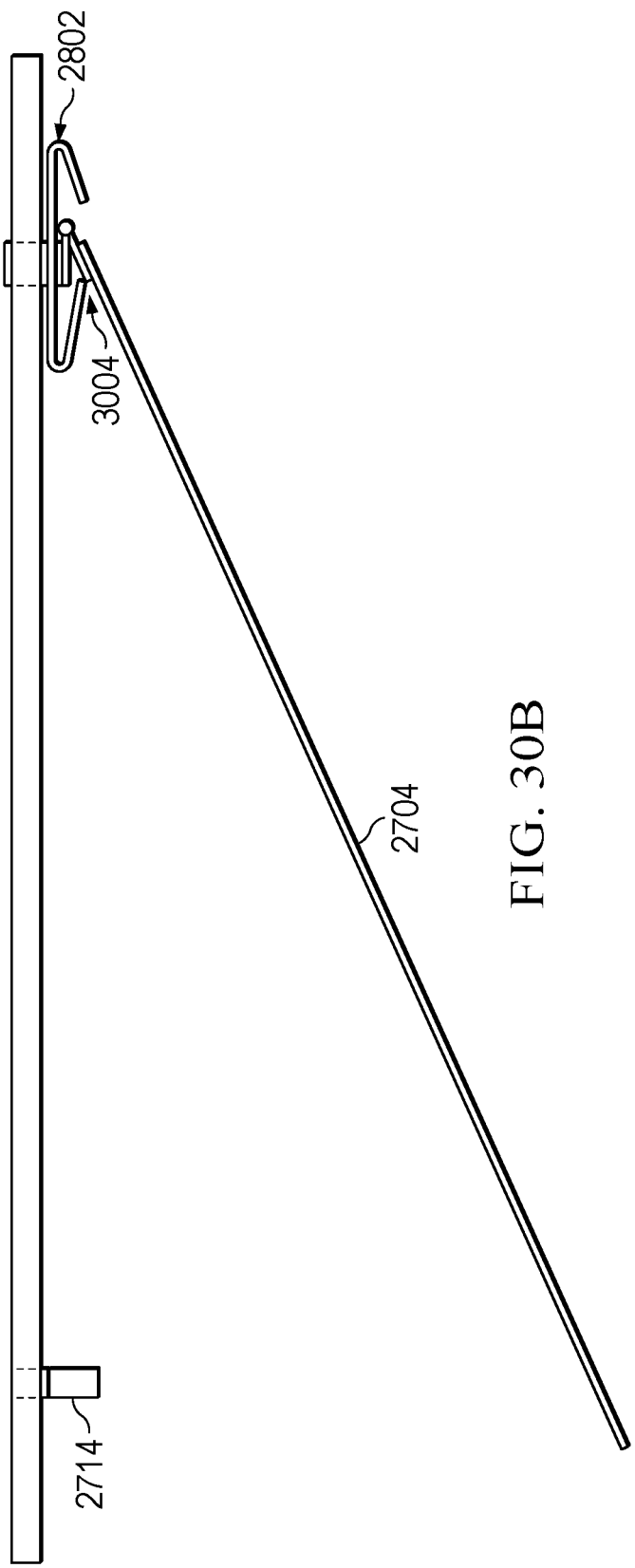

VERTICAL AXIS WIND TURBINE WITH ROTATING VANES

CROSS-REFERENCE TO RELATED APPLICATIONS PATENT

This application is a continuation-in-part of U.S. patent application Ser. No. 18/096,805, filed Jan. 13, 2023, entitled VERTICAL AXIS WIND TURBINE WITH ROTATING VANES. All of the foregoing, including Patent application Ser. No. 18/096,805, are incorporated by reference herein in their entirety.

TECHNICAL FIELD

The present invention relates to vertical axis wind turbines and more particularly, to an improved system for controlling vane movement within vertical axis wind turbines.

BACKGROUND

In 2020, there were approximately 350,000 windfarm windmills in the world. Within windfarms incorporating these windmills only horizontal axis wind turbines (HAWTs) rated from 1 MW to 12 MW in 30 mile-per-hour winds were used. In general, vertical axis wind turbines (VAWTs) do not find widespread commercial acceptance and are viewed as novelties. Since VAWTs rotate on a vertical axis, the side rotating away from the wind delivers the power to the central axis which is then translated to a generator of some type. The opposite side of the VAWT rotating into the wind creates an issue of reverse drag that must be addressed. There are many ways that have been proposed in the past to address this issue. One of the solutions is to utilize a plurality of rotating vanes that are closed on the windward side when rotating away from the wind and open the opposite side when rotating into the wind. One such system is disclosed in U.S. Pat. No. 10,041,478, issued Aug. 7, 2018 to the current inventor, which patent is incorporated herein by reference in its entirety and entitled VERTICAL AXIS WINDMILL. One issue with vane-based VAWTs is controlling the speed at which the vanes pivot between an open to closed position and a closed to open position. When done at high speeds, this transition can create quite a mechanical shock with the potential of producing a loud operating environment for the VAWT. Thus, some manner for controlling the operation of the vanes as they pivot between an open to closed position and closed to open position during operation of the VAWT would greatly increase and improve the operating environment.

A secondary issue, and primary to windfarm utilization, is the ability to fully feather the blades. Feathering is a requirement in order to secure the windmill's rotation for maintenance and safety. One method of feathering is to allow full free uninterrupted vane rotation both clockwise and counter clockwise, as will be disclosed and described herein.

SUMMARY

The present invention, as disclosed and described herein, comprises in one embodiment thereof, a vertical axis windmill turbine comprises a support structure for supporting the vertical axis windmill turbine above ground level. At least one rotor rotates upon the support structure and has a horizontal structure having a rotational axis perpendicular to the ground level. A plurality of blades are positioned within each of the at least one rotor for causing the at least one rotor to rotate on the support structure responsive to wind force. A plurality of vanes are located on each of the plurality of blades and rotate between an open position to limit drag on the at least one rotor and a closed position that provides a rotational force to the at least one rotor. The plurality of vanes rotate between the open position and the closed position of approximately 180°. A plurality of hinges each connect a vane of the plurality of vanes to a blade of the plurality of blades. The plurality of hinges have a biasing force applied thereto to slow movement of the connected vane when approaching 0° and 180°, respectively. A plurality of vane stops associated with each of the plurality of blades prevent the vane from moving past approximately 0° and approximately 180°.

BRIEF DESCRIPTION OF THE DRAWINGS

For a more complete understanding, reference is now made to the following description taken in conjunction with the accompanying Drawings in which:

FIG. 30A illustrates the manner the spring hinge assembly slows the movement of the vane near 0°; and FIG. 30B illustrates the manner the springe hinge assembly slows the movement of the vane near 180°.

DETAILED DESCRIPTION

Figure 1:
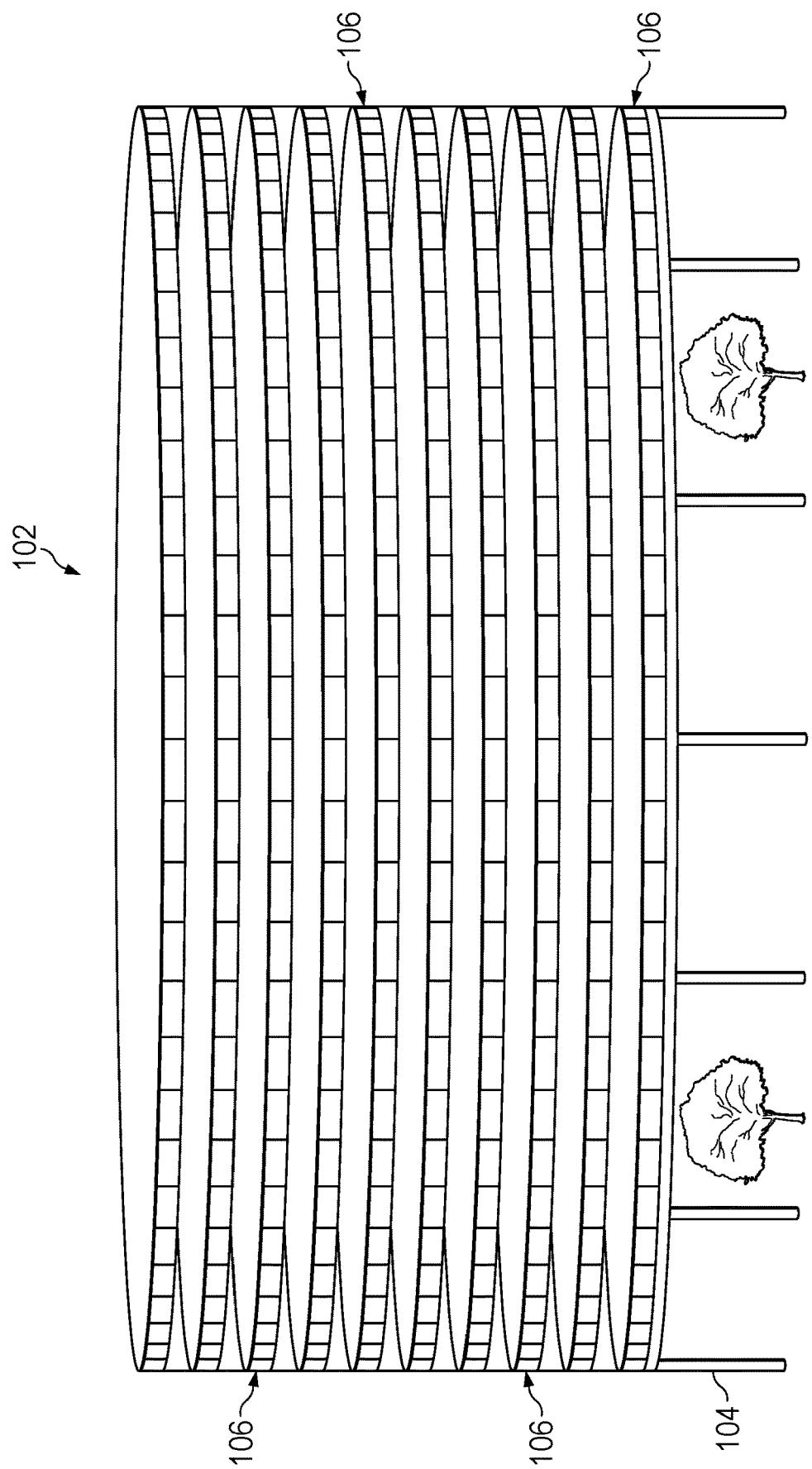
FIG. 1 illustrates a multi-rotor vertical axis wind turbine (VAWT)

Referring now to the drawings, wherein like reference numbers are used herein to designate like elements throughout, the various views and embodiments of the vertical axis wind turbine with rotating vanes are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a side view of a vertical axis wind turbine (VAWT) 102, in accordance with the present disclosure. The vertical axis wind turbine 102 includes a supporting frame 104 that supports multiple rotors 106. The rotors 106 rotate upon the supporting frame 104 responsive to wind pushing on various vanes of blades incorporated within the rotors 106 as will be more fully described herein below. The supporting frame supports the rotors 106 above the ground. The rotors 106 rotate parallel to the ground and have an axis of rotation perpendicular to the ground. The rotors 106 are supported one on top of the other and may comprise a variety of numbers of rotors. While FIG. 1 illustrates different rotor levels, fewer or more rotors 106 may be utilized as long as the supporting frame 104 can support the necessary weight and the local prevailing wind conditions can cause rotation of the rotors 106.

The vertical axis wind turbine 102 thus provides multiple rotors 106 rather than the single rotor of a horizontal axis wind turbine. A major shortcoming of horizontal axis wind turbines is due to the wind recovery spacing that can only have one rotor per windmill. The use of multiple rotors as illustrated in FIG. 1 enables each rotor's 106 efficiency and strength to be mirrored in each of the stacked rotors 106. This increases the number of rotors 106 and the wind energy that is harvested. By stacking rotors 106 caution must be used to ensure that adequate vertical spacing between rotors is maintained to prevent wind force recovery from suffering between rotors.

Figure 2:
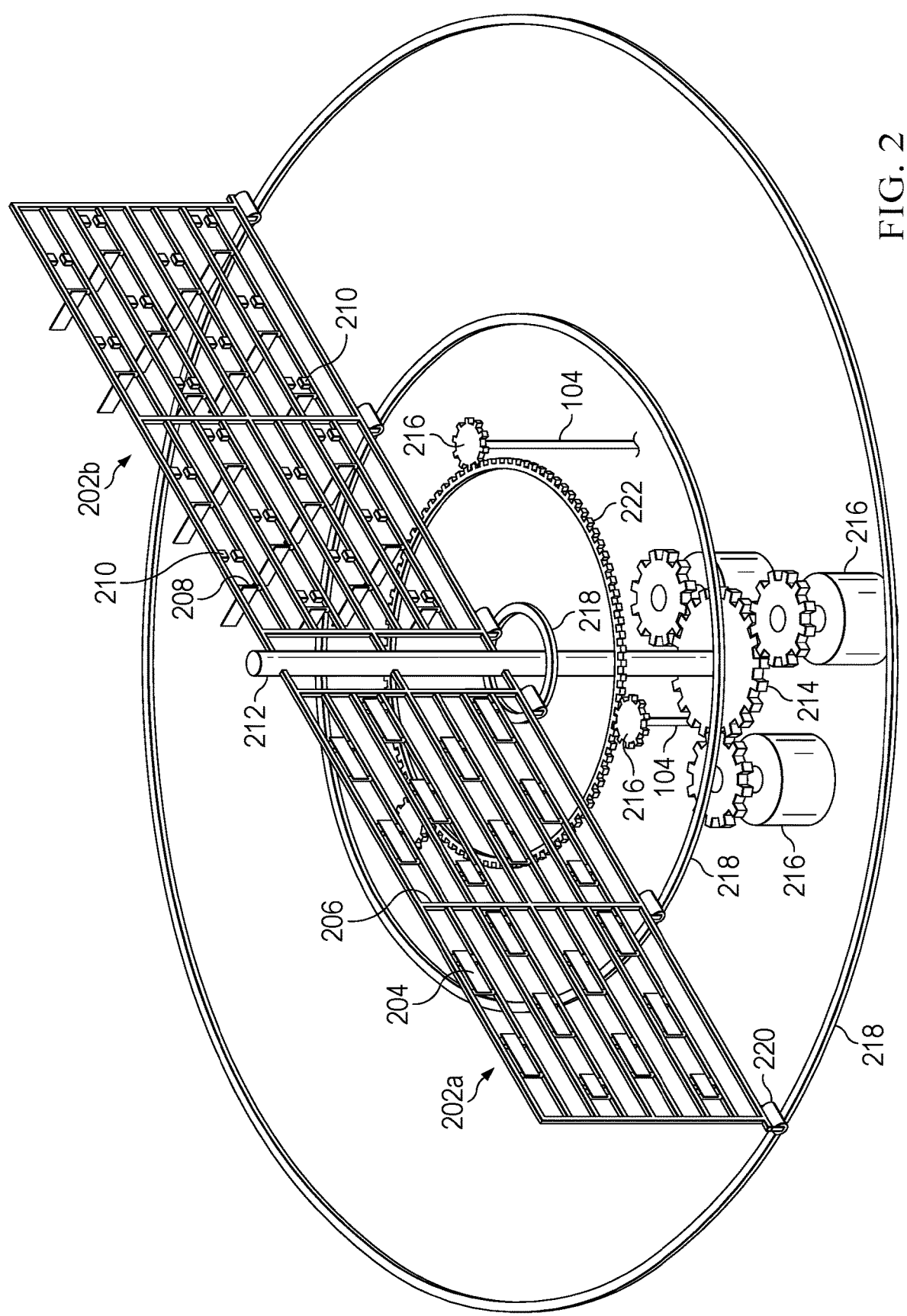
FIG. 2 illustrates two blades of a rotor of the VAWT with the vanes in both open and closed positions.

Referring now to FIG. 2 there is illustrated a pair of blades 202 disposed about the central axis in which are proximate to the central axis of a driveshaft 212, and which blades 202 comprise a portion of the rotor 106 that was referenced with respect to FIG. 1. The blades 202 illustrated in FIG. 2 are illustrated as being directly connected to the driveshaft 212. It should be understood that a plurality of blades 202 can be incorporated into each rotor 106 extending outward from the central axis of the driveshaft 212 and either connected directly thereto or indirectly through other blades 202 in the rotor 106.

Each blade 202 includes a plurality of rotating vanes 204 mounted on a blade frame 206 that can each rotate in a 360° circle about a vertical axis associated with one edge thereof. Each vane 204 connects to the vane frame 206 at a single pivot hinge 208 disposed on the one edge thereof around which the vane 204 may pivot in the 360° circle. The vanes 204 move between a closed position as illustrated in blade 202a to an open position as illustrated in blade 202b. The movement of the vanes 204 between the open position and a closed position is controlled by the movement of wind forces over the vanes 204. The vanes 204 of blade 202a in the closed position have the wind blowing against the vanes 204 to push them to rotate against a vane stop 210. The vanes 204 of blade 202b are pushed to disconnect from the vane stop 210 and move to an open position that allows wind to pass through the blade 202b opening. The blades 202a and 202b rotate about the central axis of the driveshaft 212 causing the driveshaft 212 to drive a gear 214 powering multiple generators 216. The blades 202 rest upon multiple rings 218 (rails) that comprises the supporting frame 104. Rollers 220 connected to the bottom of the blade frame 206 enable the blades 202 to rotate on the rings 218 of the support frame 104. An additional power ring 222 may also be connected to the blade frames 206 in order to enable the power ring 222 to rotate and provide rotational power to additional generators 216.

Referring now to FIG. 3, there is illustrated a top view of a single rotor 106 including multiple blade frames having vanes 304 thereon. For exemplary purposes, the rotor 106 has a radius that extends outward by the length of a single blade 202 spaced away from the central axis by distance "a" (the connection not shown to the driveshaft 212). Each blade 202 extends outward from the central axis of the driveshaft 212, there being illustrated 10 blades 202. The orientation shown illustrates the blades extending from a 0° reference point at the bottom of the diagram to a first blade 202 at an 18° orientation moving clockwise from the 0° reference point to the next blade 202 being disposed at the 54° position and the subsequent blades moving clockwise being at the position, the 126° position, the 162° position, the 196° position, the 234° position, the 270° position, the 306° position and the 342° position. Of course, this indicates one instant in the rotation of the rotor 106 for illustrative purposes. Thus, each of the blades are separated by 36°.

As can be seen, the vanes 304 are moved to differing positions based upon their orientation with respect to the prevailing wind. In FIG. 3, the prevailing wind is blowing from the direction from the bottom of the figure toward the top of the figure. There is defined a first power zone 302 between the 18° reposition and the 162° position for the specific configuration of the rotor 106 and is rotation. When vanes 304 are located generally within the power zone 302, the vanes 304 are generally closed against the vane stop 210 and provide the maximum amount of pushing force for the rotor 106. Within the power zone all vanes from the 18° position to the 162° position are closed via vane stop 210 and the max force limit stop, as will be more fully described herein below. In general, the vanes 304 will first close when the blade passes through the 0° position and remain closed until it passes the 180° position (not shown in this figure). As the blade 202 and the associated vanes 304 pass through a vane opening movement zone 306 between the 162° position and the 198° position, the vanes 304 are moved from the closed position to an open position as the tip of the vane 304 that is not connected to the pivot hinge 208 traverses along a path indicated generally at 308. As the blade 202 at the 162° position moves toward a 180° position and traverses through the vane movement zone 306, the tip of the vane 304 that is proximate or contacting the associated vane stop 210 will move away from its associated vane stop 210 in a clockwise direction due to the fact that the wind force at the 180° position is no longer imposing a force against the surface of the vane 304 opposite its associated vane stop 210. The wind force will actually shift to the opposite side or surface of the vane 304 to cause it to swing away from its associated vane stop 210 along the path 308. This all occurs within the vane opening movement zone 306, wherein the vane 304 may violently swing from a 0° closed position to a 180° open position depending on the wind speed. The quick movement may cause the vane 304 to overshoot the 180° direction. This is of no concern as the vane 304 is free to swing with no stops. Any overshoot will be quickly corrected by the prevailing wind. This movement from the closed position to the open position is caused by the force of the wind pushing on the side of the vane 304 to push it away from the associated vane stop 210. This causes a 180° swing of the vane 304 from the closed position to the open position when the associated blade 202 is disposed at the 180° position. When the blaze is disposed at the 198° position, the vane 304 will be at approximately 160° position with respect to its associated blade 202.

After moving through the vane opening movement zone 306, the vanes 304 will now be referred to by the reference numeral "310" as open vanes 310 located in the open position with the open vane 310 aligned with the wind. The open vanes 310 will be associated with the positions 198°, 234°, 270°, 306° and 342°. The open vanes 310 within this area are said to be in the "No force area" as indicated generally at 312. The No force area 312 is the area during which the open vanes 310 are aligned with the wind direction and no force is provided for movement of the rotor 106 from any of the open vanes 310. Open vanes 310 within the No force area 312 are 360° free swiveling and align themselves with the wind direction. The movement of the open vanes 310 to the open position also limits drag that would be caused by the wind had they been maintained in the closed position. This greatly minimizes the overall drag on the rotor 106. As the open vanes 310 rotate out of the No force area 312 through a vane closing movement zone as indicated generally at 314, the open vanes 310 will move from the open position to the closed position with the tip of the vane not connected to the pivot hinge 208 moving along the pathway shown generally at 316. As illustrated, at the 198° position, the open vane 310 is disposed at an angle of 162° relative to the associated blade 202, at the 234° position, the open vane 310 is disposed at an angle of 126° relative to the associated blade 202, at the 270° position, the open blade 310 is disposed at an angle of 90° relative to the associated blade 202, at the 306° position, the open blade 310 is disposed at an angle of 54° relative to the associated blade 202 and at the 340° position, the open blade 310 is disposed at an angle of 18° relative to the associated blade 202. Thus, as the blade 202 moves from the vane opening movement zone 306 clockwise towards the vane closing movement zone 314, the open vane 310 moves from an open position 180° away from its associated vane stop 210 to a contact position with respect to the associated vane stop 210.

It can be seen that movement from the 340° position to the 0° position results in the open vane 310 moving from an angle of 18° relative to the associated blade 202 to an angle of 0° relative to the associated blade 202 and thus being designated a vane 304, i.e., a closed vane 304. This comprises a much smaller swing movement than that occurring in the vane opening movement zone 306, and the open vane 310 will swing from the open to the closed position and stop its rotation when the open vane 310 contacts the associated vane stop 210. The movement of the open vane 310 within the vane closing movement zone 314 is virtually unperceivable. However, the vane 310 is subject to osculate, open and close, when wind direction shifts during this crossover. The rotor 106 will continue its rotation in the manner previously described with the vanes periodically opening and closing depending upon the orientation of the vane with respect to the wind. The force of the wind on the open vane 310 as it traverses through the No force area 312 is minimal and equal on each surface or side of the open vane 310. As soon the open vane 310 passes through the 0° position, the wind force will be directed toward the surface of the vane 304 (now the closed vane) on the side opposite to its associated vane stop 210.

Figure 3A:
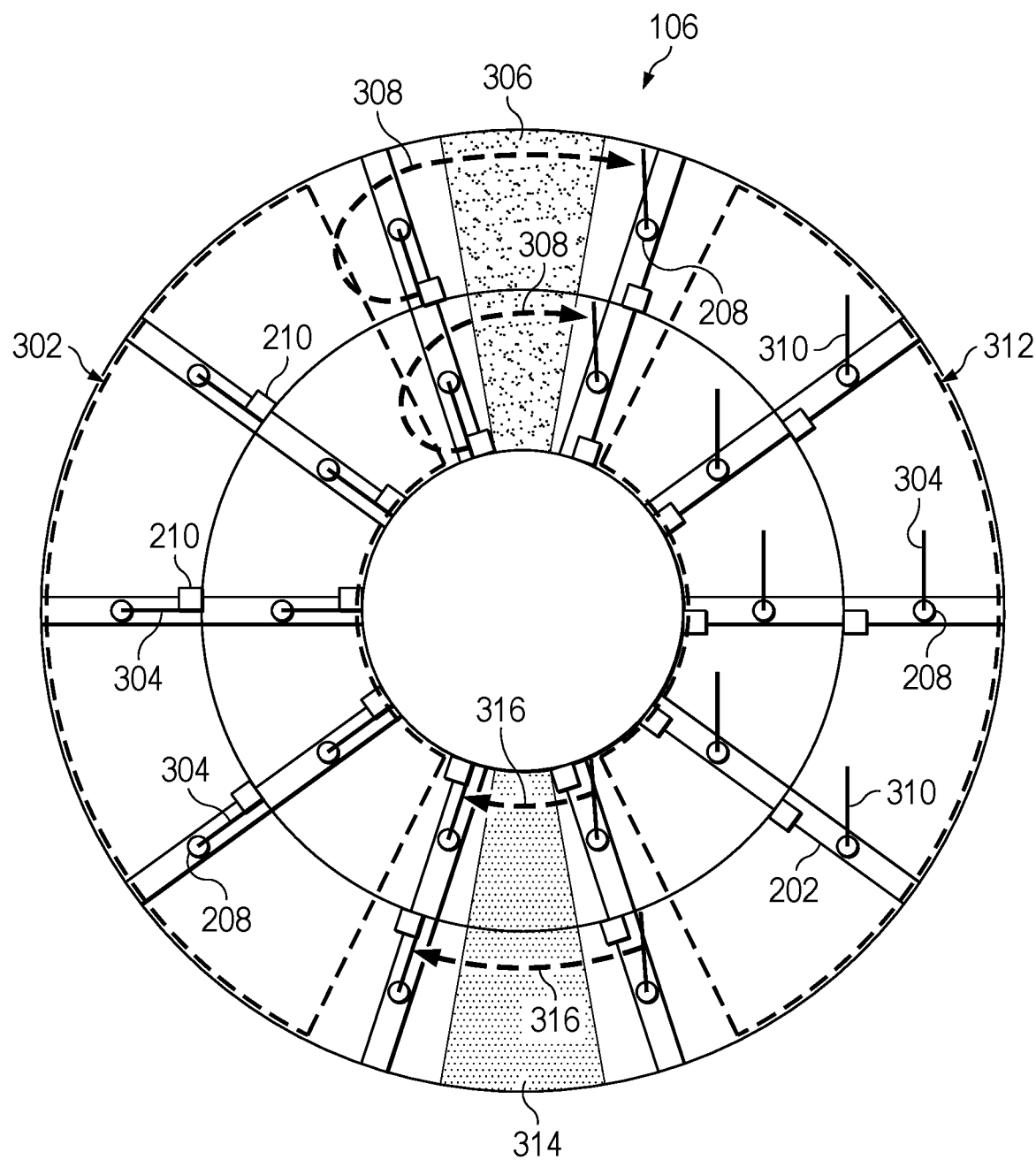
FIG. 3a illustrates the movement of vanes between the open and closed positions as the rotor spins.
Figure 3B:
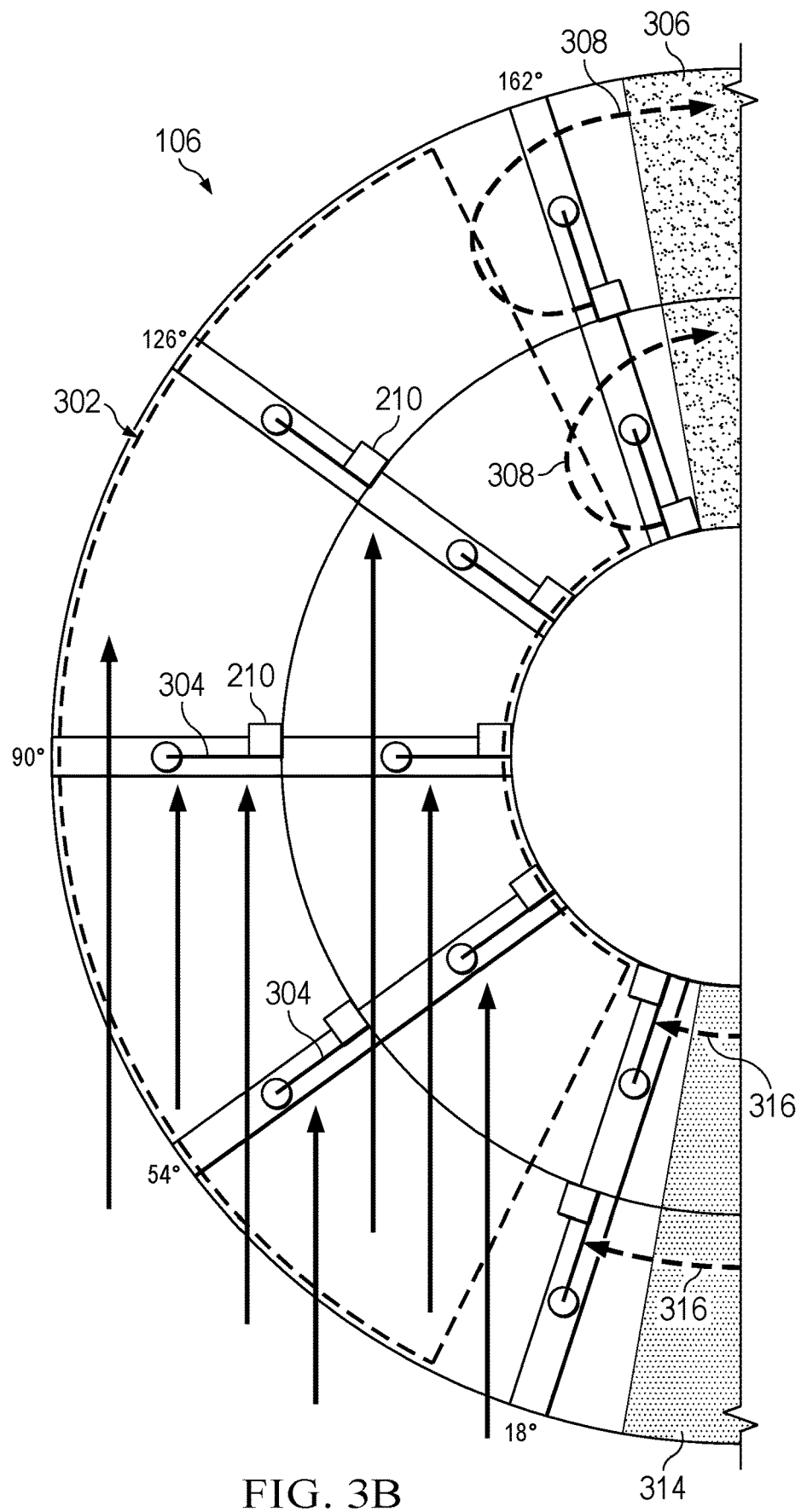
FIG. 3b illustrates the wind flowing through the power side of the rotor.

There are numerous configurations for both the blade and vane arrangements. The primary goal of the various arrangement combinations is to maximize the wind force recovery distance between a first blade before striking a subsequent blade and provide the best utilization of space within an area of the turbines. Blade vane patterns fall into two basic classes. The first comprises two-dimensional placement. Within a two-dimensional placement, all blades have the same vane pattern. This appears to save space, but more space may be required from blade to blade to enable sufficient wind force recovery. To illustrate this, the embodiment of FIG. 3A is illustrated with wind flow in FIG. 3B, wherein the wind flowing through the power side 302 of the rotor 106 is illustrated. It can be seen that the wind flow initially hits the blade 202 at the 18° position at an angle of 18° with respect thereto. The vanes 304 are thus forced shut. It can then be seen that the two vanes 304 in the blade 202 at the 54° position are also impacted by the wind force that bypasses the edge of the blade 202 at the 18° position. The blade 202 at the 90° position also has two vanes 304. It can be noted that the vanes 304 are offset by each other by the width of the vane 304. For example, if each vane 304 has a width of 5 feet; that means that there is a 5 foot gap between the vanes 304 when they are closed. This allows wind to pass through the two vanes 304 on the panel 202 at the 54° position to impact the vanes three or four on the panel 202 at the 90° position. The vane patterns may further be programmable as each vane has independent feather control that may allow vanes that are desired not to be used to be feathered and provide any desired vane pattern within the blades.

An alternative arrangement is a three-dimensional arrangement that provides a cubic checkerboard pattern as will be more fully discussed herein below. This configuration provides for the best wind force recovery. In the direction of rotation, the odd-numbered blades and the even number blades have inverted patterns wherein the vanes in the odd-numbered blades do not align with the vanes in the even-numbered blades. This gives the appearance of doubling the wind force recovery distance as the odd blade's wind is not blocked by an even blade, but continues to recovery until reaching the next odd blade. This is more clearly illustrated in FIG. 4A.

Figure 4A:
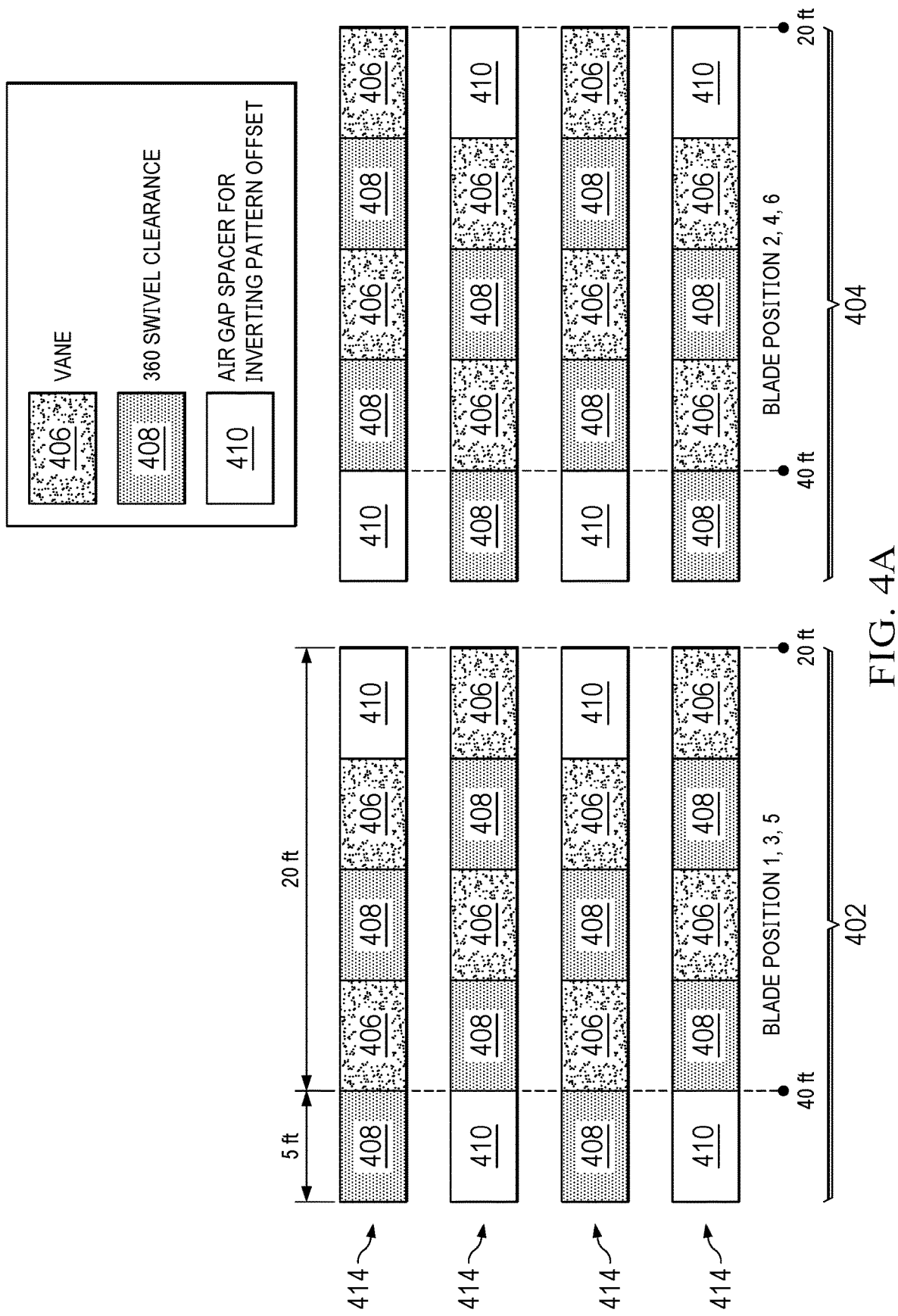
FIG. 4a illustrates the offset position of vanes to limit the wind interference between blades on a rotor.

In FIG. 4A, blades 402 indicate the odd blades while blades 404 indicate even blades. Areas 406 represent the vanes. Areas 408 represent the swivel clearance associated with a vane. Areas 410 are not required, however they are automatically formed by the enclosing frame. As can be seen, a blade 404 would be located behind a blade 402 upon a rotor. Thus, a vane 406 on the odd blade 402 has an opening 408 behind it rather than another vane 406. Thus, vane 406 on an odd blade 402 will not block airflow to a vane 406 on an even blade 404. This improves the wind recovery as discussed above. It should be further noted that each odd blade 402 and even blade 404 in the illustration of FIG. 4 is associated with four different rotors 414 oriented along the vertical axis.

Figure 4B:
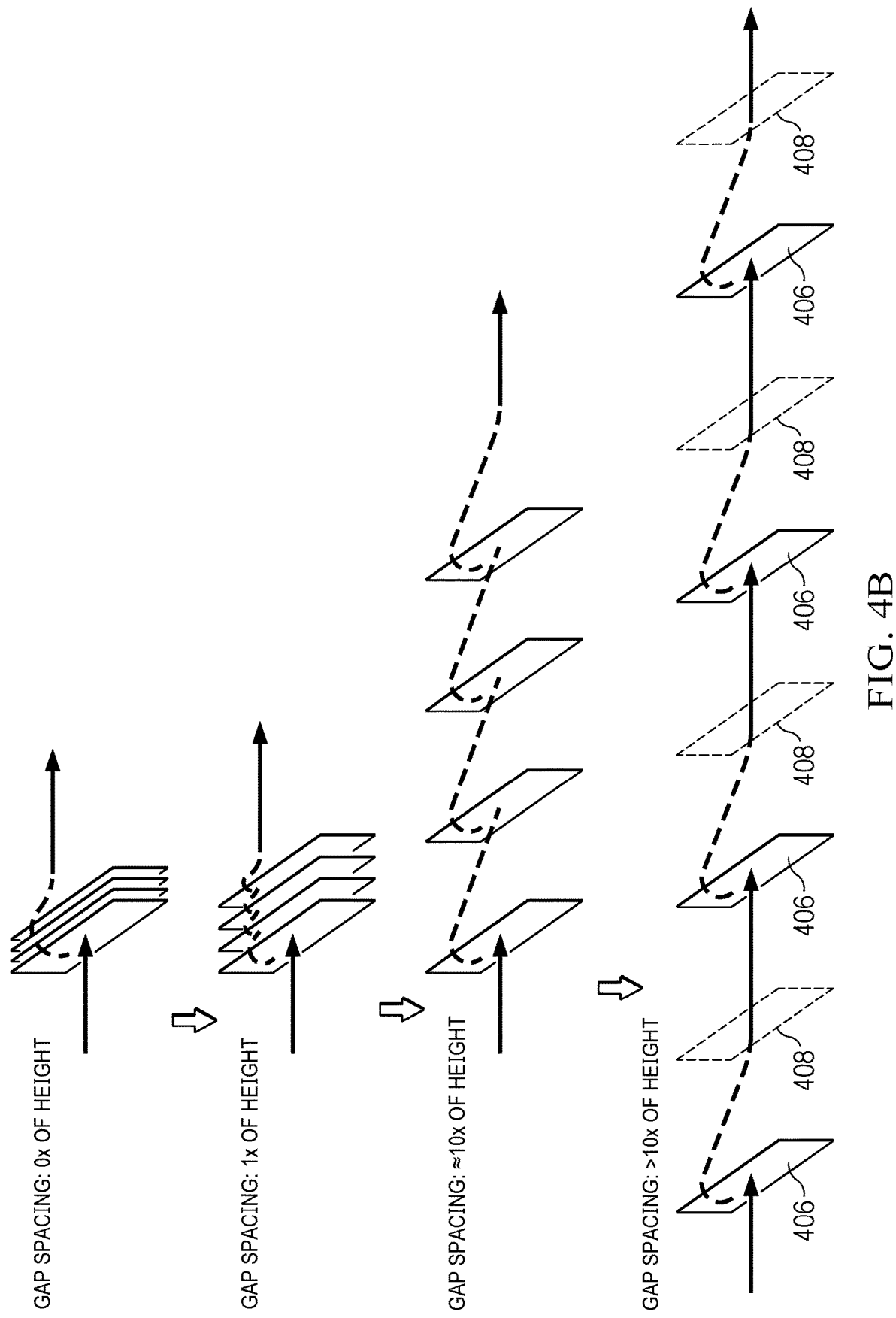
FIG. 4b illustrates a diagrammatic view of series of adjacent vanes illustrating the wind flow through the adjacent vanes.
Figure 4C:
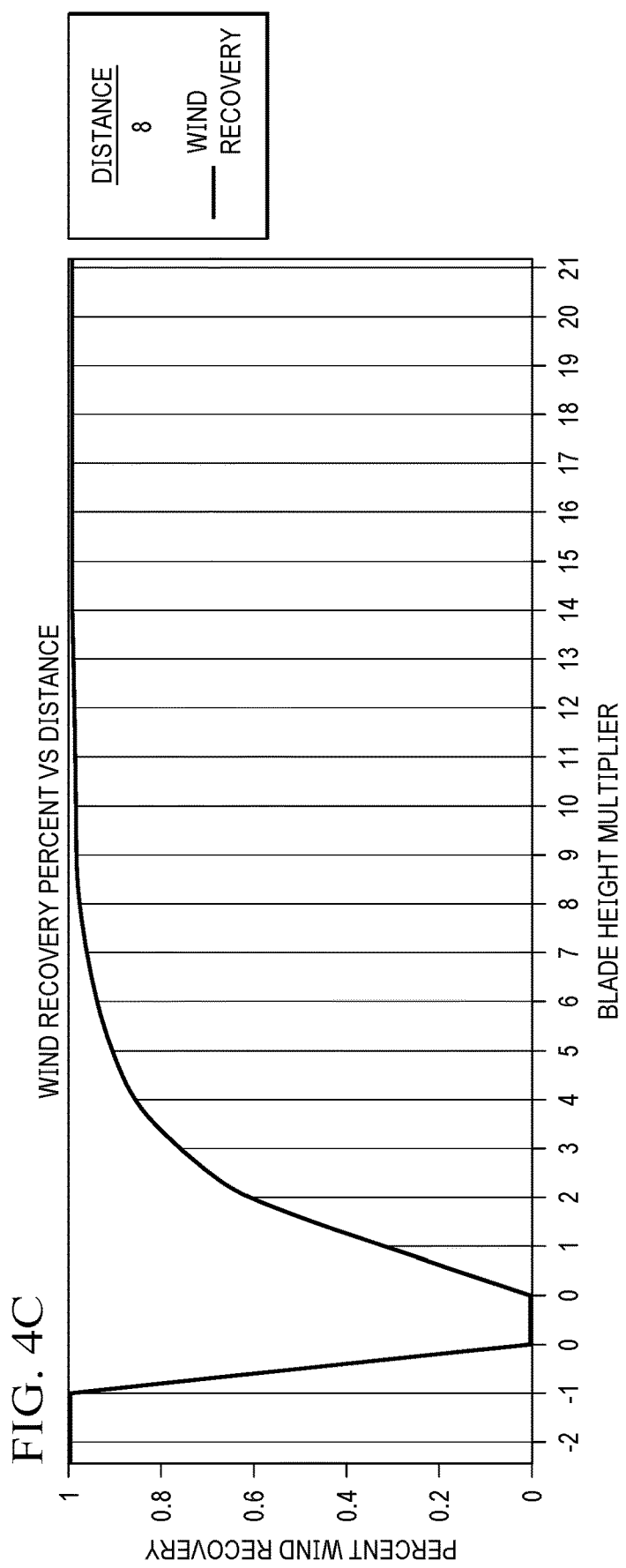
FIG. 4c illustrates a graph of wind recovery vs. distance between adjacent vanes.

FIG. 4B illustrates the blade-to-blade wind recovery distance between odd to even blades having an inverted checkerboard pattern When recovery is based the ability of when, when being directed at a solid surface passes over that solid surface and requires the energy that basically existed at that solid surface. In the illustration of FIG. 4B, there are illustrated a sequence of vanes separated by different distances relative to their height. In the top diagram, the gap spacing between vanes is 0× the height. In the second sequence, the vanes are separated by a gap spacing of 1× the height of the vanes. In the third sequence, the vanes are separated by gap spacing equal to approximately 10× the height of the vanes. It can be seen between the second sequence and the third sequence that the force of the wind on the initial surface of the first vane to left of the grouping of vanes has increased such that the third sequence provides almost the full wind power to each subsequent vane in the grouping. As the gap spacing exceeds 10× of the height of the vanes, it can be seen in the fourth sequence that the force of the wind is fully recovered.

Figure 5:
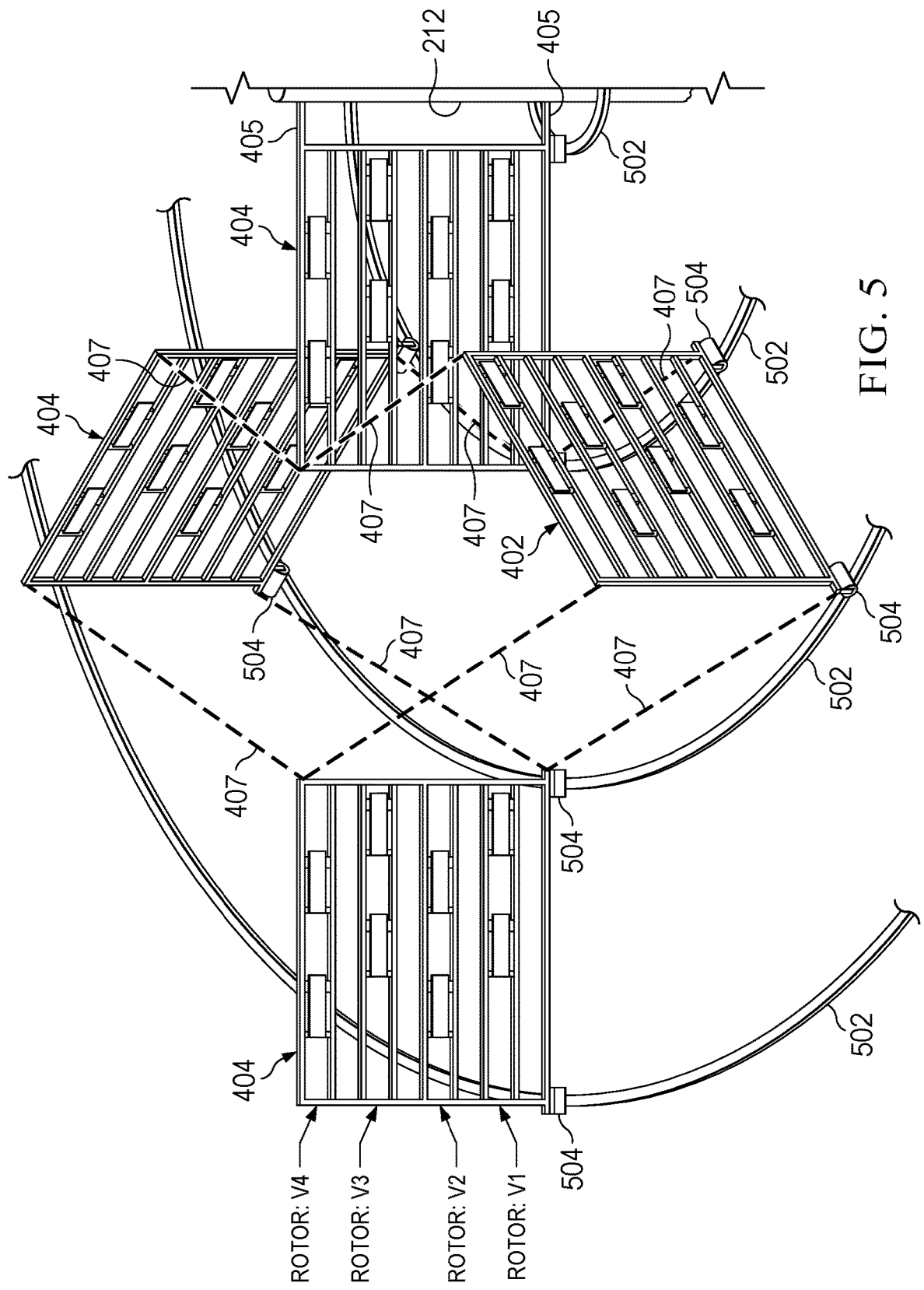
FIG. 5 illustrates the manner in which vanes are supported within a VAWT.

In the fourth sequence, there is illustrated the odd and even blades and the associated checkerboard pattern discussed with respect to FIG. 4A, wherein it can be seen that the vane 406 on an odd blade 402, for example, would have an opening 408 on the even blade 404 adjacent thereto. The wind would be allowed to recover more completely by passing through the opening 408 as opposed to there being another vane disposed in this position on the next adjacent blade. This can best be seen with respect to the graph illustrated in FIG. 4B. Referring now to FIG. 5, there are illustrated the placement of various odd blades 402 and even blades 404 upon support rings 502 of the VAWT. As can be seen, the odd-numbered blades 402 are placed in such a fashion that the vanes 406 of the odd-numbered blade 402 do not line up with the vanes 406 of the even-numbered blades 404 located beside them. As discussed previously, the blades 402 and 404 are supported on the support rings 502 using rollers 504. The top and bottom corners of blades 402 and 404 are then interconnected via braces 407 as indicated by dashed lines. These braces 407 are arranged in such a manner that the outer top corner and the outer bottom corner of an inner blade 402/404 is connected to the inner top corner and the inner bottom corner, respectively, of adjacent blades 402/404 on the next outermost ring. These braces 407 can be made of light tubular metal, such as aluminum, or they can utilize cables. For example, when an outer even blade 404 is disposed on the outermost two support rings 502, the innermost upper corner and lower corner thereof interface with a leading and trailing blade 402/404 of the next innermost set of blades 402/404. With tubular stock, this will allow this outermost blade even 404 to actually push the leading even blade 404 on the next innermost ring and pull the trailing odd blade 402 on the next innermost ring. With cables, there can only be tension, such that the inner top corner and the inner bottom corner of the outermost even blade 404 will pull on the outer top corner and outer bottom corner of the trailing blade odd 402. The innermost blade 44 is illustrated as having two connections 405 to the pole 212.

The rings 402 supply an elevated 20-foot to 75-foot platform without undulations for the blades 402 to travel on. The rings 502 can be directly attached to poles or towers. However, this can cause undulation issues from ring to ring as well as horizontal stability from ring to ring. In lieu of connecting the rings 502 directly to poles, the rings can be connected to an elevated platform which is supported by a fewer number of poles or towers. This would provide a major improvement in stabilizing the rings' 502 vertical undulations and ring to ring horizontal movement. The rollers 504, as will be described in more detail herein below allow the blades 402 and 404 to move laterally to account for tolerances in the overall structure.

With respect to blade alignment between the support rings 502, in order to treat the cubic checkerboard pattern, an extra vane space 410 was added to the blades lengths as described hereinabove. This extra vane space 410 is used as a spacer or open space for the vane to swivel 360°. Therefore, as this extra vane space does not contribute to the harvested wind forces, it can overlap the next rings blade by one vanes base. It must however be separated from the next ring's blade, in the direction of rotation, by at least the vane's length in order to avoid a vane-to-blade collision.

Figure 6:
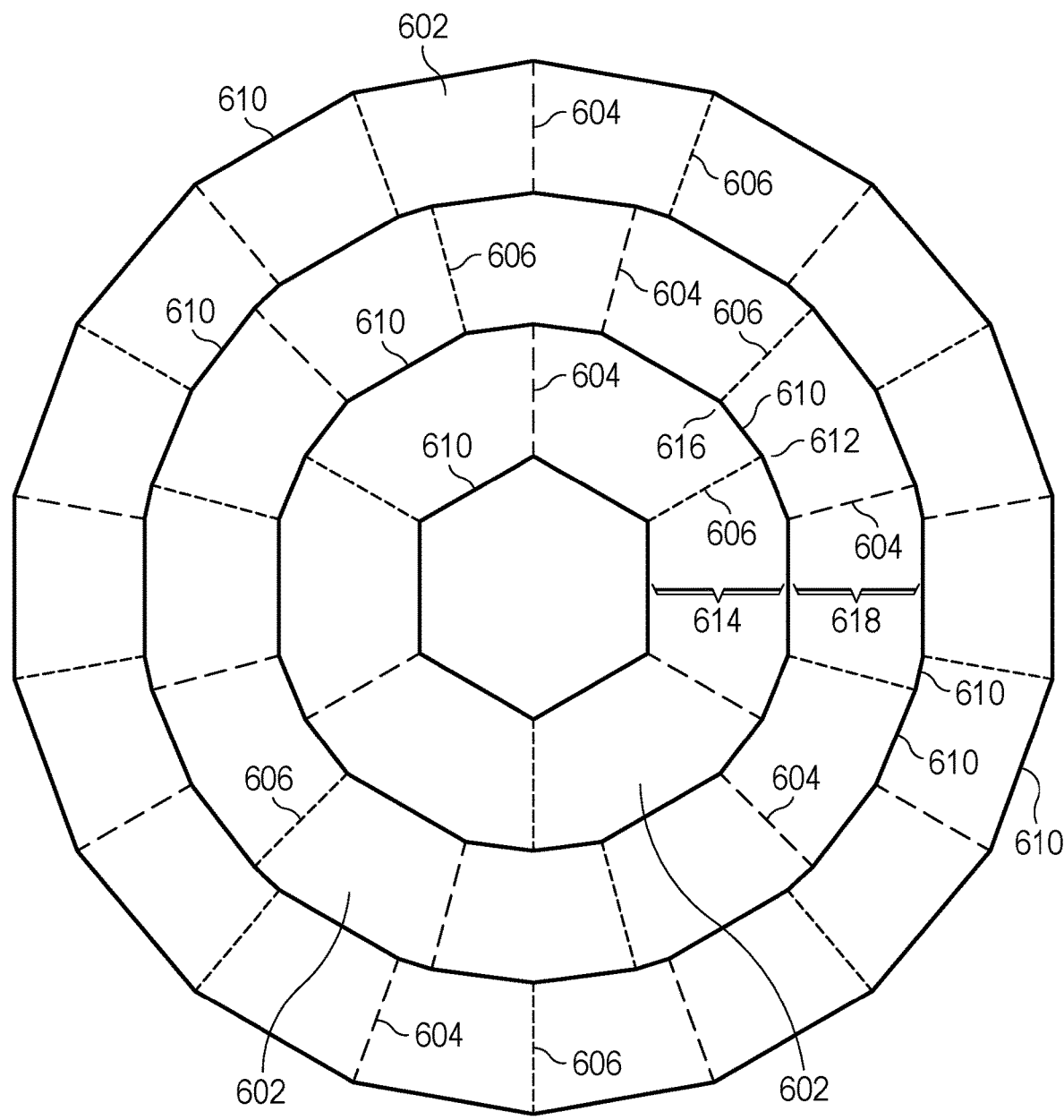
FIG. 6 illustrates blade placement within multiple rings of a rotor and blade support structures.

Referring now to FIG. 6, there is illustrated the manner in which blades 604 may be placed in multiple rings extending outward from the central axis of the VAWT. Within each of the rings 602 individual odd blades 604 and even blades 606 are shown to not be perfectly aligned with each other. Even though it is possible, it is generally not recommended to align blades such that they are all on the same radial angle throughout each of the concentric rings. Part of the rotation bracing is to minimize the brace length from blade to blade. If contiguous blades are used from ring to ring, this will reduce blade bracing strength in the direction of rotation. Therefore, ring to ring blade pattern should be separated in the direction by increments of one quarter of the distance of the wind recovery spacing of the blades' direction of rotation. Thereby bisecting the rotational blade brace and effectively shortening its length while increasing its strength. Contiguous spacing of the blades would reduce blade strength in the direction of rotation of the rings. Blade braces 610 interconnect the odd blades 604 and even blades 606. It can be seen there are various braces 610 similar to braces 407 described hereinabove disposed between the blades 604 and 606. For example, there is illustrated an outer corner 612 disposed between the outer corner 612 of the even blade 606 on an inner ring 614. This is connected to an inner corner 616 of a blade 606 on a next adjacent ring 618. There is a brace 610 disposed between the outer corner 612 of the blade 606 on the ring 614 and the inner corner of the blade 606 on the ring 618.

With respect to the population of blades 604, 606 within a support frame the blades per ring will increase by the roots rings blade quantity of six blades. All rings will have an even number of blades due to odd and even vane pattern. Subsequent blade roots are offset from previous ring blade tips by 5 feet, 10 feet, 15 feet. As the blade is 5 feet longer than the ring spacing, the additional 5 feet overlaps the next blade. Therefore, there needs to be a minimum of 5 foot clearance for the vane to swing past the next ring's blade without striking. The number of blades, total blades and index offset of the blades is more fully illustrated in Table 1 herein below.

| RING | RADIUS | BLADES | INDEX DEG | BLADE TOTAL |
|---|---|---|---|---|
| $1^{ST}$ RING | 20 ft | 6 | 60 | 6 |
| $2^{ND}$ RING | 40 ft | 12 | 30 | 18 |
| $3^{RD}$ RING | 60 ft | 18 | 20 | 36 |
| $4^{TH}$ RING | 80 ft | 24 | 15 | 60 |
| $5^{TH}$ RING | 100 | 30 | 12 | 90 |
| $6^{TH}$ RING | 120 | 36 | 10 | 126 |

Figure 7:
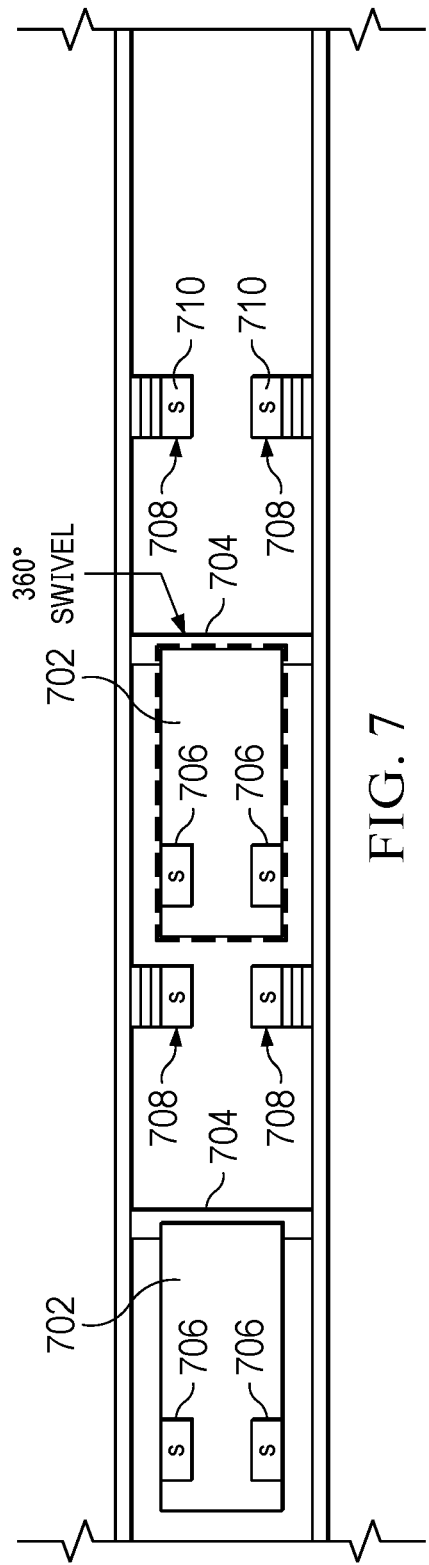
FIGS. 7-9 illustrates the operation of vanes when moving from the open to the closed position.
Figure 8:
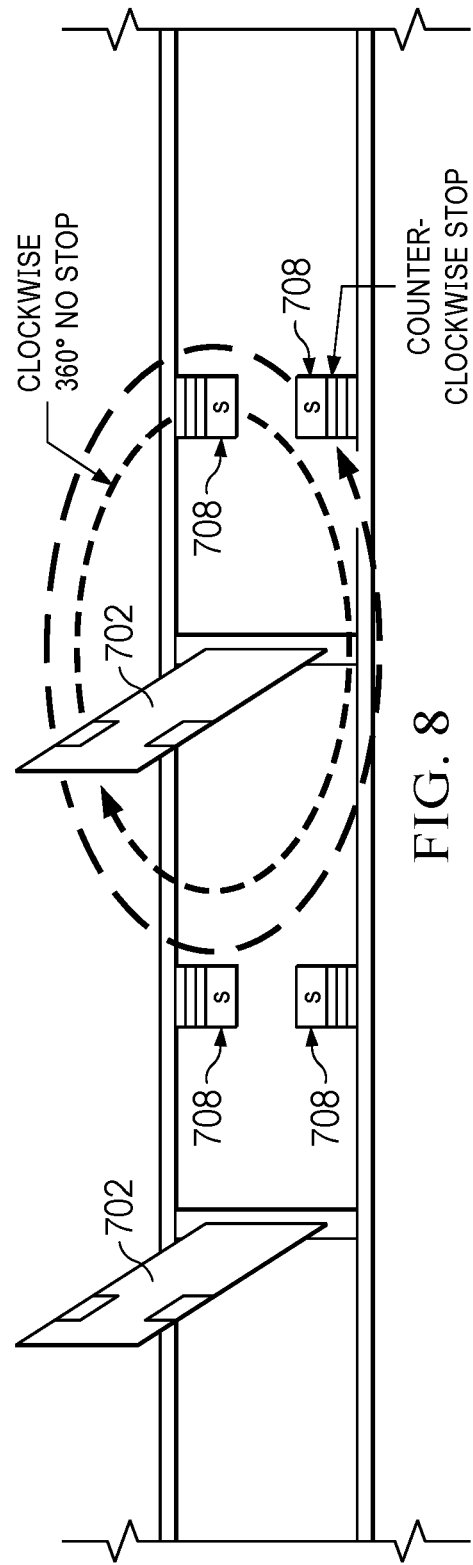
Figure 9:
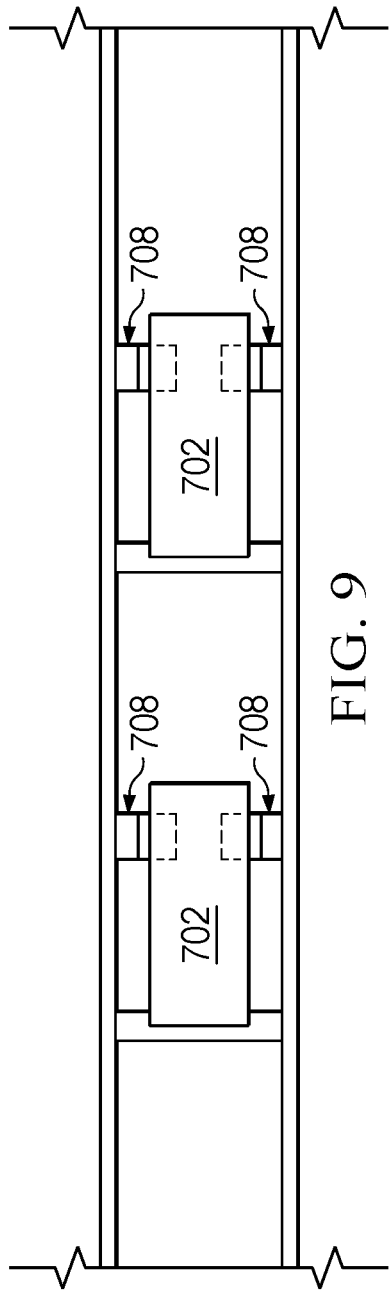

Referring now to FIGS. 7-9, there is illustrated the manner for controlling the closing of vanes from the open position to the closed position in a manner that will provide for a soft closing of the vane to the closed position to limit sound pollution caused by the vanes repeatedly banging against a vane stop as the turbine is continuously rotating. It should be noted that generally any material that absorbs mechanical shock and softens the speed of the mating surfaces can be used, such as soft rubber gasket. For this example opposing magnetic forces are used. Referring now to FIG. 7, there is illustrated a pair of vanes 702 that are both in an open position. Referring now also to FIG. 8, there is illustrated the process as the vane 702 swivels from the open position toward the closed position of engagement with the vane stop 708. FIG. 9 illustrates the vane 702 in the closed position against the vane stop 708. As discussed previously, the vanes 702 are connected at an end thereof on a hinge 704 that allows the vane's 702 tip to swivel 360°. The vane 702 additionally includes a pair of magnets 706 thereon. A vane stop 708 prevents the vane 702 from swiveling past a certain point when the wind causes the vane to swivel against the vane stop 708. The vane stop 708 additionally includes magnets 710 thereon. The magnets 706 located on the vane 702 and the magnets 710 located on the vane stops 708 are positioned in such a manner that the South poles of the magnets 706, 710 will directly oppose one another when the vane 702 swivels to the closed position. The South Pole of the magnet 706 on the vane 702 and the South Pole of the magnet 710 on the vane stop 708 will magnetically repel each other. The repelling forces of the magnets 706, 710 will cause the vane 702 to softly engage the vane stop 708 rather than slamming the vane 702 into the vane stop 708. This slowing of the engagement between the vane 702 and vane stop 708 is due to the repelling forces of the magnets 706 and 710.

Figure 10:
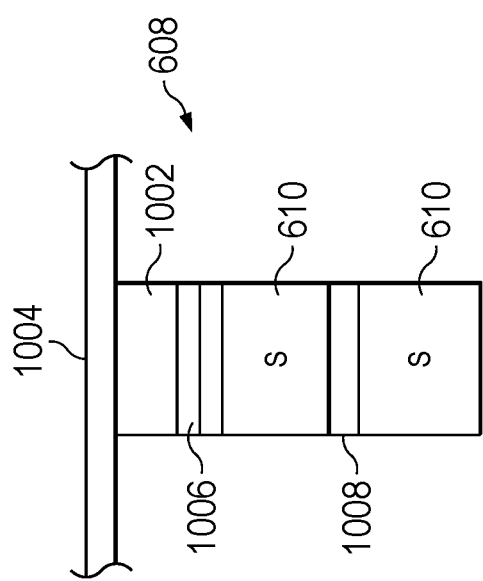
FIG. 10 illustrates a functional block diagram of a vane stop.

Referring now to FIG. 10, there is illustrated a functional view of the vane stop 608. The vane stop 608 includes a fixed portion 1002 that connects to the blade support structure 1004. The magnets 610 are interconnected with the fixed portion 1002 via a hinge 1006. The magnets 610 are connected to a magnet support arm 1008, and the hinge 1006 interconnects the magnet support arm 1108 and the fixed portion 1002. The hinge 1006 enables the magnet support arm 1008 to bend upward and allow the vane 602 to pass by the magnate support arm 1008 when the vane is being feathered or during high wind conditions as will be more fully described herein below.

Figure 11:
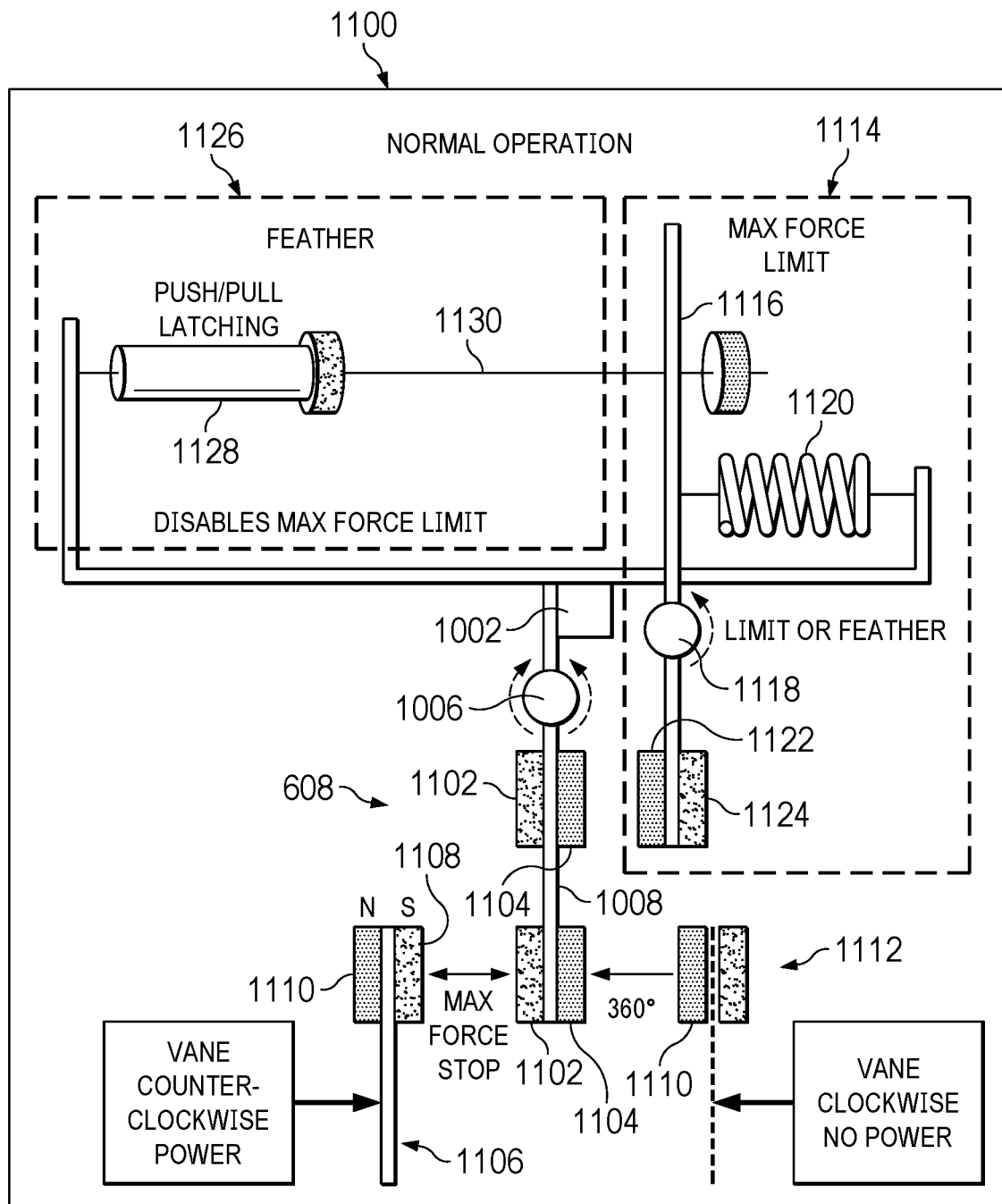
FIG. 11 illustrates a vane control mechanism associated with each of the vanes of the VAWT.

Referring now to FIG. 11, there are illustrated the various components of the vane control mechanism 1102 in normal operation. The vane stop 608 as described includes the fixed portion 1002 and the magnet support arm 1008 interconnected via a hinge 1006. Magnets 1102 having an outward facing South Pole are placed on one side of the magnet support arm 1108 and magnets 1104 having an outward facing North Pole are placed on the opposite side of the magnet support arm 1008. A vane 1106 includes magnet 1108 having an outward facing South Pole on one side and a second magnet 1110 having outward facing North Pole on the opposite side. In normal operations, the vane stop 608 extends straight downward, and when the vane 1106 approaches the vane stop 608, the outward facing magnets 1102 and 1108 having South poles oriented toward each other slow the manner in which the vane 1106 will come in contact with the vane stop 608. Thus, when the wind is blowing the vane 1106 closed against the vane stop 608 rather than clashing against each other, the vane 1106 and vane stop 608 will have a much softer interaction due to the opposing South pole forces of the magnets 1108 and 1102. Should the vane 1106 swivel 360° in the opposite side of the vane stop 608, the outward facing North poles of magnets 1110 and 1104 would act in a similar fashion due to the repelling forces provided by the opposed North poles on the magnets.

The max force limit mechanism 1114 is used for maintaining the vane stop 608 in a downward extended position to block the movement of the vane 1106 until a maximum wind force is encountered. The max force limit mechanism 1114 includes a pivot arm 1116 that pivots about a pivot point 1118. The pivot point 1118 can comprise a hinge or other mechanism enabling the pivot arm 1116 to pivot. A spring 1120 provides a biasing force to the pivot arm 1116 for maintaining the pivot arm in a predetermined position. Other devices may be used for providing the biasing force including but not limited to a stretch spring, compression spring, elastic bands, magnetic components or electromagnetic components. The vane stop 608 responsive to wind forces applied to the vane stop by the vane 1106 presses against the bottom portion of the pivot arm 1116 causing the pivot arm to attempt to pivot about pivot point 1118 and overcome the biasing forces of the spring 1120. The pivot arm 1116 will remain in the predetermined position until the wind force overcomes the biasing force associated with the spring 1120. The biasing force applied by the spring 1120 is known as the max force limit associated with a maximum wind speed. The operation of the max force limit mechanism 1114 will be more fully described with respect to FIG. 12. The pivot arm 1116 also includes magnets located on the lower portion of the pivot arm that interact with magnets on the vane stop 608. Magnet 1122 has its North Pole oriented to face outward and oppose the North Pole of magnet 1104 of the vane stop 608. A second magnet 1124 is located on the opposite side of the lower portion of the pivot arm 1116.

The purpose of the max force limit mechanism 1114 is to reduce the mechanical shock from wind gusts.

$$Force=0.0034 \times area \times WindSpeed^2$$

$$Force=((0.0034 \times (1/0.0034))=294) \times WindSpeed^2=WindSpeed^2 \text{(when the area=294sqft)}$$

Given: Wind Speed of 40 mph
Windmill rotation speed of 10 mph
Relative Wind Force Speed of 30 mph
Force=30 2=900 Lbf per 294 sqft Wind gust to 60 mph
Windmill rotation speed of 10 mph
Relative Wind Force Speed of 50 mph
Force=50 2=2500 Lbf per 294 sqft
Mechanical Shock: 2,500 (−) 900=1,600 Lbf (until windmill rotational speed increases)

The feathering mechanism 1126 is used for disabling and enabling the max force limit mechanism 1114 to enable the vane 1106 two freely swivel past the vane stop 608. When a vane is a feathered by the feathering mechanism 1126, the vane stop 608 will freely move out of the way of the vane 1106 when the vane comes in contact with the vane stop 608 because the max force limit pivot arm 1116 will be moved out of the way as will be more fully described with respect to FIG. 13. The feathering mechanism 1126 includes a latching solenoid 1128 connected to an actuation arm 1130. In the non-feathered mode of operation, the solenoid 1128 positions the actuation arm 1130 such that it does not engage the pivot arm 1116 of the max force limit mechanism 1114. In the feathered mode of operation, the solenoid 1128 causes the actuation arm 1130 to retract causing the pivot arm 1116 to move the lower portion of the pivot arm out of the way of the vane stop 608 enabling the vane stop to swing upward when engaged with the vane 1106.

Figure 12:
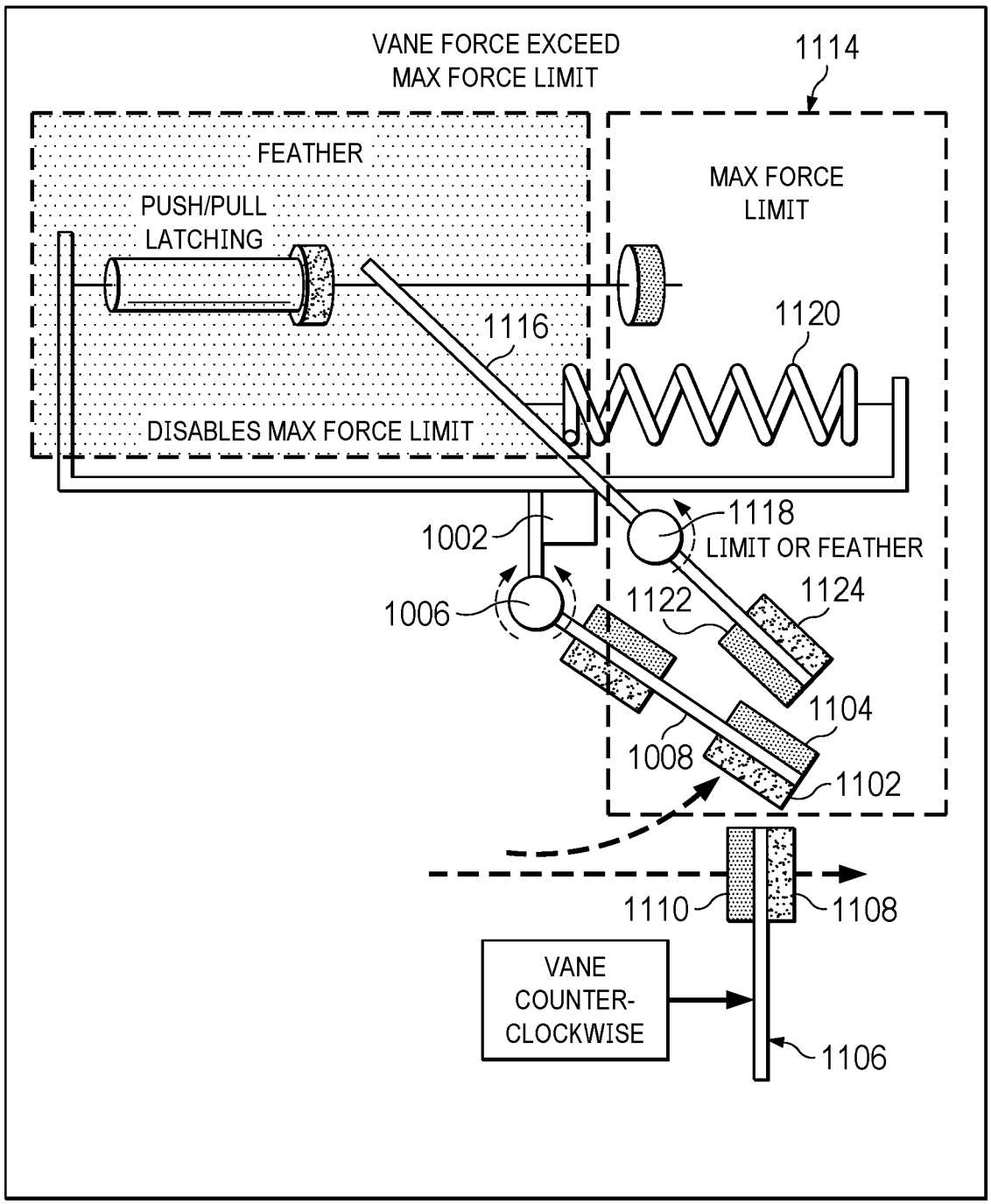
FIG. 12 illustrates the operation of the max force limiter mechanism.

Referring now to FIG. 12, there is illustrated the operation of the max force limiter mechanism 1114. The max force limit is attained when the wind forces that are applied to the vane 1106 exceed the biasing force of the spring 1120. When the max force limit is attained, the force of the vane 1106 pushing on the vane stop 608 will cause the magnet support arm 1008 to pivot upwards at the pivot point 1006. The pivoting of the magnet support arm 1008 will push against the bottom portion of the pivot arm 106 causing the pivot arm 106 to pivot about pivot point 1118. Movement of the bottom portion of the pivot arm 1116 enables the vane stop 608 to pivot upward about hinge 1006 and out of the way of the vane 1106. The vane 1106 may then pass by the vane stop 608. The pivot arm 1116 and vane stop 608 would then pivot back downward about their respective hinge points 1006 and 1118 after the force of the vane 1106 being applied to the vane stop 608 is removed. This is caused by the biasing forces applied by the spring 1120.

The max force limit mechanism 1114 holds the vane 1106 in position using the opposing magnetic fields from the magnets 1108 and 1102. The vane 1106 and vane stop 608 also have opposing magnets 1110 at 1104 to prevent the vane from turning in one direction such as counterclockwise, to create a force when the wind blows. For clockwise rotating rotors, the vane stop 608 will stop counterclockwise vane movement while allowing the vane 1106 to freely travel 360° clockwise. This free clockwise vane travel enables the vane 1106 to correct itself when positioned on the wrong side of the vane stop 608. This can occur during startup when all vanes, both power and drag, are aligned with the starting wind direction.

When in the maximum force limit condition, the wind force pressure on the vane 1106 transmits a force to the vane stop 608, which in turn, applies a force to the max force limiting torsion spring 1120. When the vane 1106 overcomes the torsion spring 1120, the vane stop 608 folds back enabling the vane 1106 to pass. After passing, the vane stop 608 and max force limiting arm 1116 return to their normal position responsive to the biasing force of the torsion spring 20. A delaying method for the torsion spring 1120 recovery may be employed to ensure the vane fully passes the vane stop 608. A processor may monitor a maximum force trip indicator to determine when a vane 1106 trips the maximum force trip limit.

In the normal force mode of operation, half of the windmills vanes will be closed, (blade power side from 0° to 180°) and half are open and aligned with the wind, (blade drag side 180° to 360°). With respect to the blade, the vane is closed in the 0° position until the blade reaches the 180° position with respect to the wind. At this point, the vane 1106 opens to the blade's 180° position. The vane 1106 continues to return to the zero position as the blade returns to the winds zero position. During normal operation, the vane 1106 never crosses to the blades 180° to 360° position.

Figure 13:
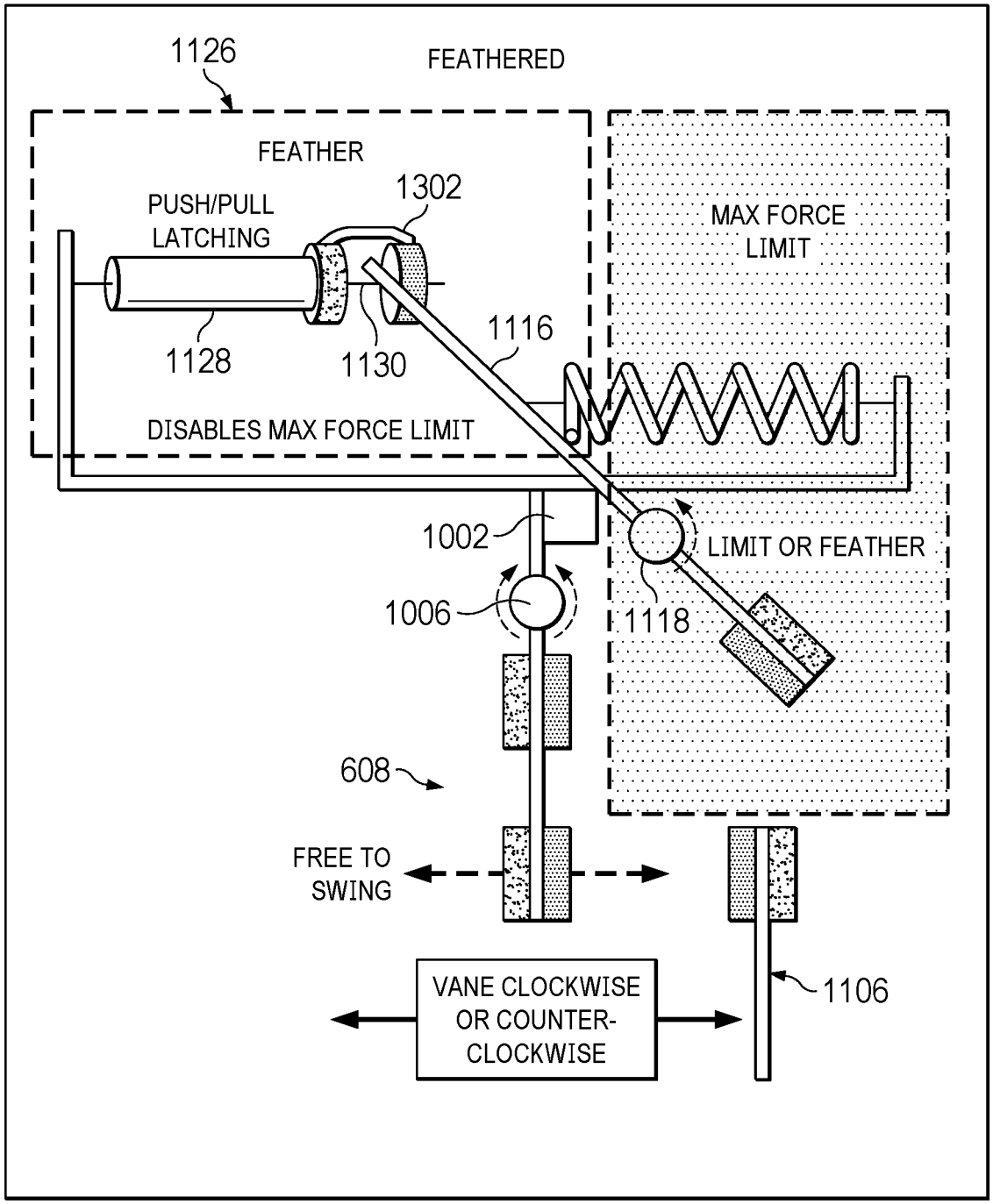
FIG. 13 illustrates the operation of the feathering mechanism.

Referring now to FIG. 13, there is illustrated the feathering mechanism 1126 in operation. The feathering mechanism 1126 turns the max force limiter mechanism 1114 on and off. The feathering mechanism 1126 enters the feathering mode of operation by using the solenoid 1128 to retract the actuation arm 1130. The retraction of the activation arm 1130 causes the pivot arm 1116 of the max force limit mechanism 1114 to pivot about the pivot point 1118 causing the lower portion of the pivot arm 1116 to move out of the way of the vane stop 608. This enables the vane stop 608 to swing freely about its pivot point 1006. Thus, when the vane 1106 comes in contact with the vane stop 608, the vane 1106 will rotate past the vane stop 608 because contact with the vane stop 608 will cause the vane stop to swing out of the way responsive to pressure applied thereto by the vane 1106. The feathering mechanism 1126 may include a safety magnetic latch 1302 associated with the solenoid 1128 in order to magnetically latch the actuation arm 1130 into the feathering mode position.

The feathering mechanism 1126 enables the rotation of the VAWT to be fully stoppable and locked for assembly, maintenance and weather. It also enables selective feathering for controlling and distributing stress, as well as controlling the maximum harvested power and the VAWTs revolutions per minute. The feathering mechanism 1126 may provide for full feathering to stop rotation of the rotor. The feathering magnetically locks open the maximum force limit soft stop that allows all vanes to freely rotate 360°. This enables the safe performance of assembly or maintenance processes. Additionally, the feathering mechanism 1126 may be used by magnetically locking open the maximum force limit soft stop on selected vanes or groups of vanes to distribute the stress load on the VAWT and control the VAWT's revolutions per minute. Selective feathering is employed as an added precaution from high and gusty winds. Furthermore to increase wind recovery spacing, in some wind conditions, from blade to blade can be achieved by feathering all odd blades; thereby doubling the wind recovery spacing. Additional wind recovery spacing can be achieved by feathering every other even blade.

Figure 14:
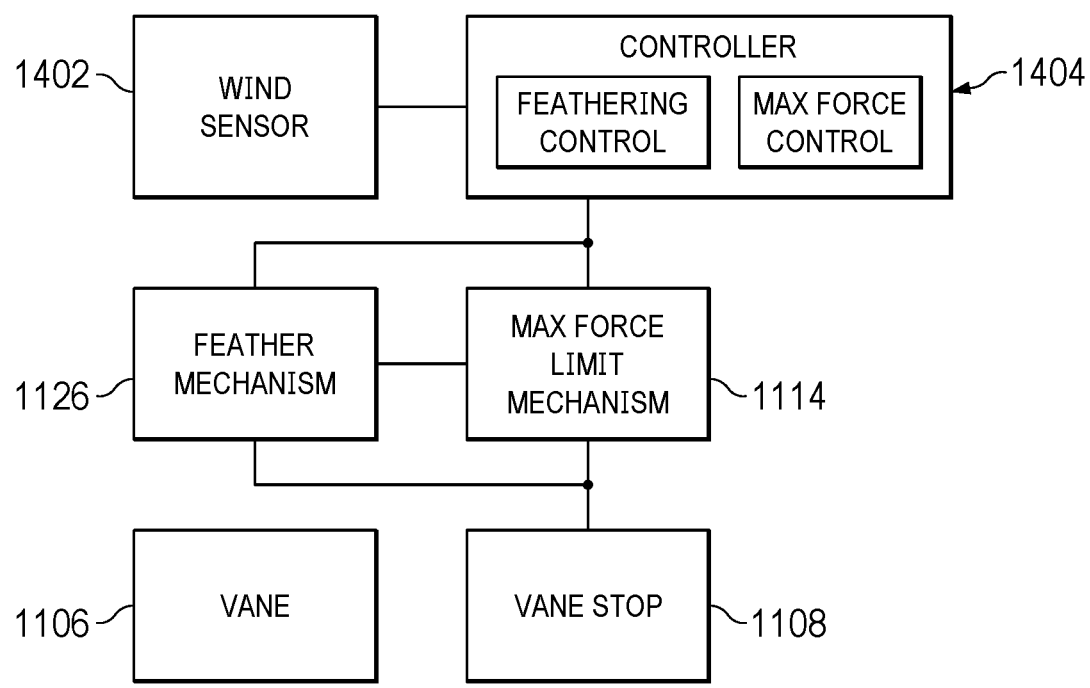
FIG. 14 illustrates a functional block diagram of the vane control mechanism.

Referring now to FIG. 14, there is illustrated a functional block diagram of the control circuitry that can be associated with the vane control mechanism. The vane 1106 and vane stop 1108 operate in the manners discussed hereinabove. The operation of the vane stop 1108 is controlled using the feathering mechanism 1126 and the max force limiter mechanism 1114 in the manner described with respect to FIGS. 12 and 13, respectively. The feathering mechanism 1126 and max force limiter mechanism 1114 may operate according to control signals received from a max force controller 1104. These control signals from the controller 1104 could actuate the solenoid 1128 of the feathering mechanism 1126. The control signals could also be applied to a variable force mechanism that is substituted for the spring 1120 of the max force limit mechanism 1114. The variable force mechanism would apply particular forces to the pivot arm 1116 in place of the spring 1120 and thus control the max force limit that can cause actuation of the max force limit mechanism 1114. An alternate method of feathering can be achieved by reducing the max force limit to zero, thereby eliminating the need for the feathering control hardware. A wind sensor 1402 would connect to the feathering/max force controller 1104 in order to provide inputs to the controller 1404 regarding the wind speed. It should be appreciated that other types of force sensors can be used with respect to detection of the forces applied from or to the vane 1106. When the wind achieves predetermined strength levels, the controller 1404 could provide control signals to the max force limit mechanism 1114 to enable the vane stop 1108 to move from its fixed position, or alternatively, if some type of system maintenance were being performed, the vanes could be feathered by using the feathering mechanism 1126 to actuate the solenoid 1128 therein in the manner described hereinabove. Other types of means for controlling the operation of the feather mechanism and the max force limiter mechanism would be apparent to one skilled in the art.

Figure 19:
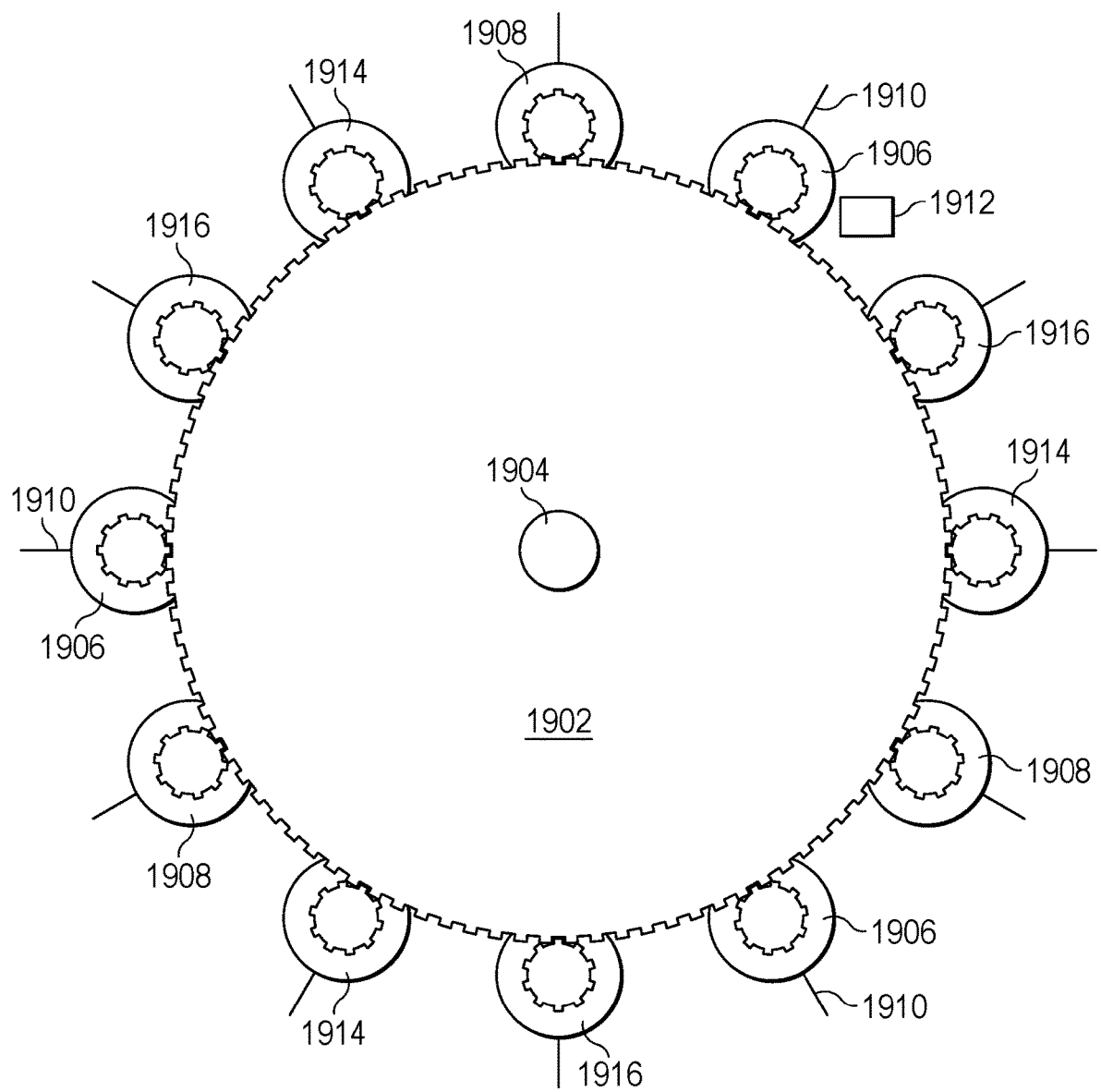
FIG. 19 illustrates a power generation mechanism associated with a central hub of a VAWT.
Figure 20:
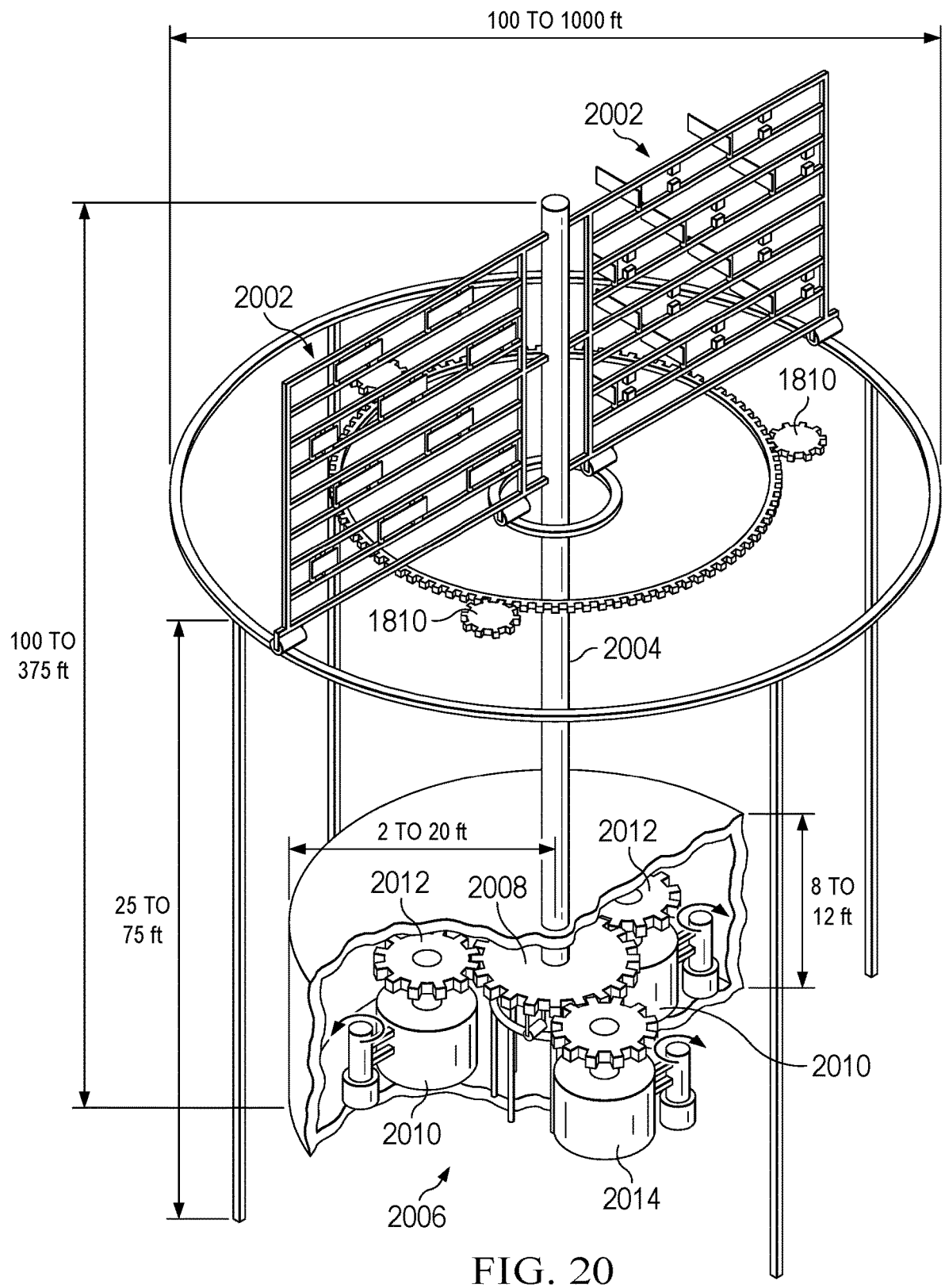
FIG. 20 illustrates the implementation of a generator, brake, idler and indexing motor with respect to a central hub of a VAWT.

Both mechanical and electrical energy can be supplied by the VAWT, at the same time, via a power takeoff gear. There are two types of power gears. A direct drive gear as shown more particularly in FIGS. 15-18 and an indirect power gear via the central power axle of the VAWT as shown in FIGS. 19 and 20. A direct drive gear is directly connected to the lowest rotor connecting directly to the blades bottom support. Multiple gears can be attached at various radius along the radius of the rotor's blade assembly. The generators can be mounted on the support poles or support lattice. Within an indirect power gear each rotor is connected to a central power axle that transmits the rotating torque into a power gear located near ground level. Due to the power gear's large radius and weight, it may rotate on its own supported ring. The power gear radius is primarily limited by the radius of the first ring support pole/tower. Numerous takeoff generators can be located around the power gear in a planetary configuration. Both direct and indirect power extraction can be used at the same time. For example, direct drive power gears can supply power for devices needing extremely high rpm operating speeds with low torque while indirect power drive can be used for devices needing low RPM operating speeds with a high torque.

Figure 15:
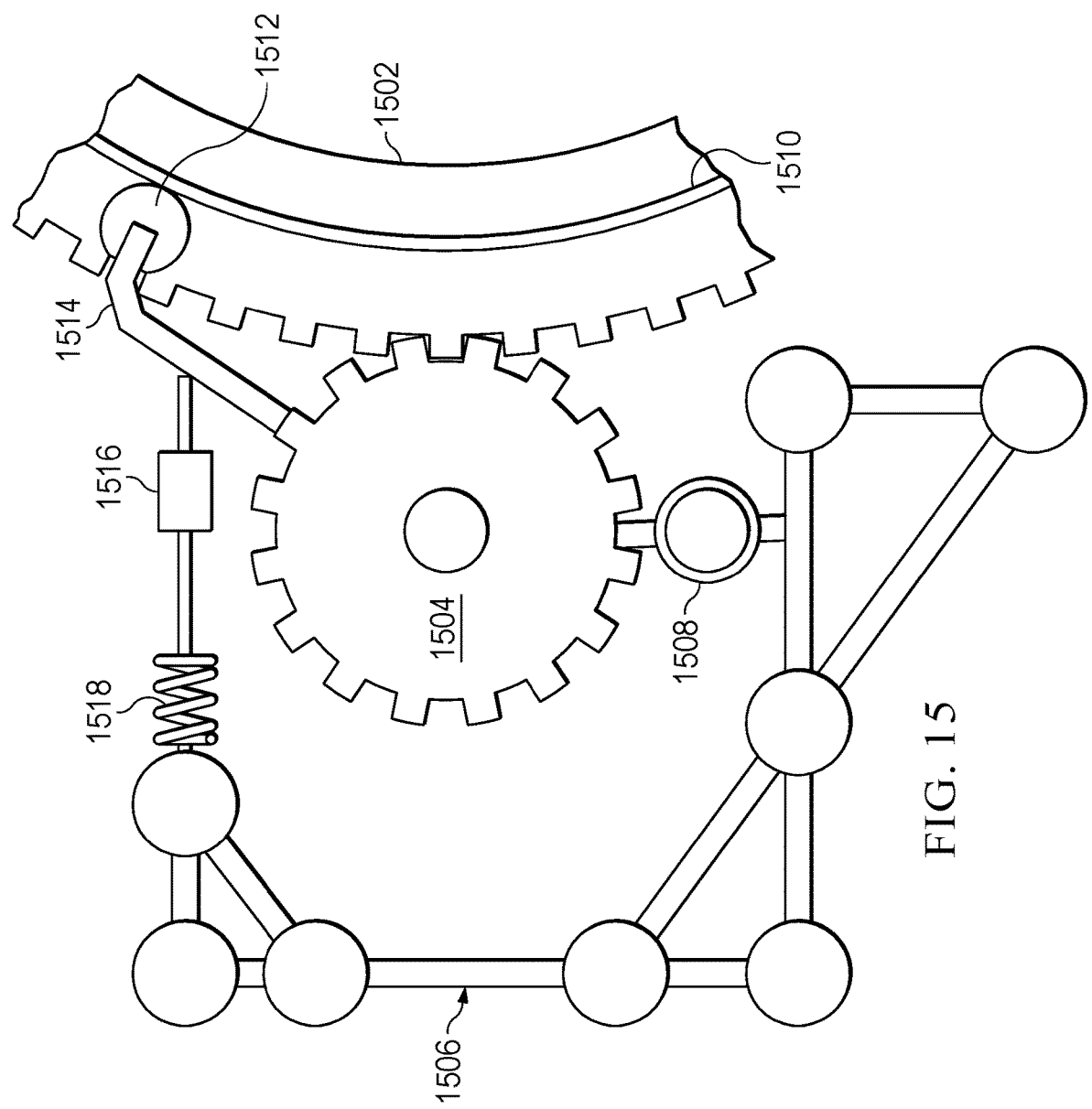
FIG. 15 illustrates a first embodiment of a power generation mechanism associated with a power ring of a VAWT.

Referring now to FIG. 15, there is illustrated one manner in turnoff one disclosed embodiment in which power may be generated from the VAWT turbine. By placing a power gear 1502 (also see FIG. 2, reference number 222) on the bottom surface of a rotor, power may be generated from one or more fixed generators 1504 that will rotate responsive to turning off the power gear 1502 on the bottom surface of the rotor. The power gear 1502 is fixedly connected to the bottom surface of a rotor such that the power gear 1502 will rotate concurrently with the rotor. The fixed generator 1504 is connected to a support frame 1506 via a generator pivot hinge 1508. A roller bearing 1510 is located on the side of the power gear 1502 and comprises a small ledge extending out from the surface of the power gear 1502. A roller 1512 is connected to the fixed generator 1504 via a support arm 1514. The roller 1512 rolls along the roller bearing 1510 and the support arm 1514 moves the generator between an engaged position that engages the teeth of the fixed generator 1504 with the teeth of the power gear 1502 and a disengaged position when the teeth of the fixed generator do not engage with the power gear 1502. When in a disengaged position the support arm 1514 raises the fixed generator 1504 such that the teeth of the fixed generator disengage from the teeth of the power gear 1502. Movement of the fixed generator between the engaged position and the disengaged position is enabled via the generator pivot hinge 1508. An actuator 1516 connects between the support arm 1514 and that the support frame 1506 to move the support arm between the engaged and disengaged positions.

The power gear 1502 may be out of round and the generator teeth must track the gear teeth with a minim 1/10 inch clearance to prevent binding and breakage of the gears. To compound the problem the power gear 1502 and generators 1504 may have separate supporting structures with no mechanical linkage between the two. This issue is addressed by tracking the power gears relative position to the generator 1504 and adjusting the generators position to maintain the required clearance. A spring 1518 enables for tension tracking in order to enable movement back and forth of the fixed generator 1504 that is in the engaged position due to out of round conditions of the fixed generator 1504 or the power gear 1502 that are detected. This is controlled by the actuator 1516.

Figure 16:
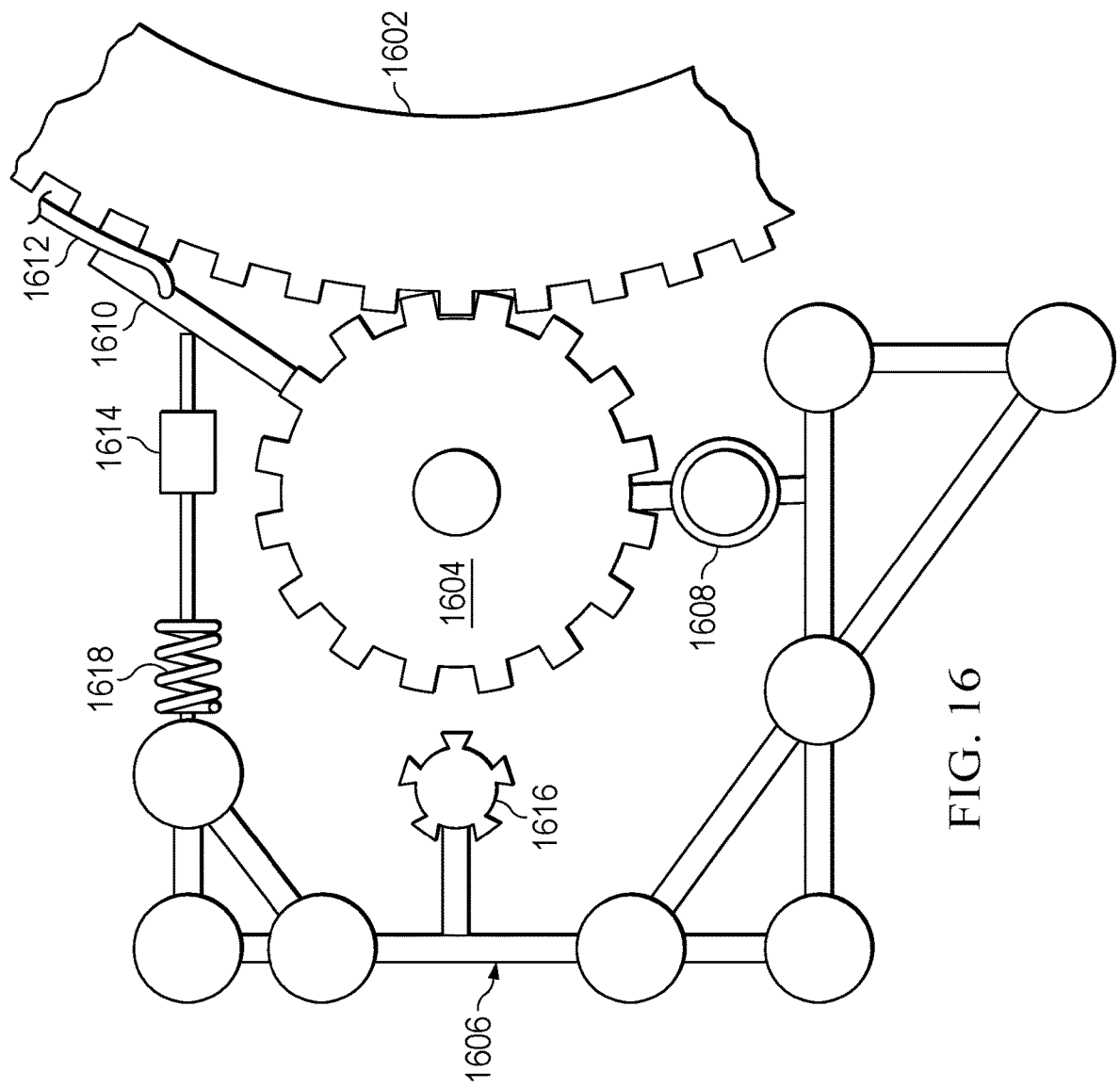
FIG. 16 illustrates a second embodiment of a power generation mechanism associated with a power ring of the VAWT.

Referring now to FIG. 16, there is illustrated an alternative embodiment of the power generator for use with a VAWT turbine. The power gear 1602 rotates to provide power to the fixed generator 1604 in a manner similar to that described with respect to FIG. 15. The fixed power generator 1604 is again fixed to a support structure 1606 via a hinged pivot connection 1608. In this case, engagement arm 1610 interconnects the fixed generator 1604 with a skid plate 1612. The skid plate 1612 tracks along the surface of the gears of the power ring 1602. The actuator 1614 moves the fixed generator 1604 between a first position that engages the operation of the generator with the power ring 1602 and a second position that engages the fixed generator 1604 with a spin up motor synchronizer 1616. The spin up motor synchronizer 1616 initiates operation of the fixed generator 1604 when it is in a stopped position. The engagement arm 1610 pivots the fixed generator 1604 on pivot hinge 1608 to have its teeth engage the gear teeth of the spin up motor synchronizer 1616. Once the generator has been sufficiently spun up, the actuator arm pivots the fixed generator 1604 such that the teeth of the fixed generator 1604 engage the teeth of the power ring 1602. The power ring 1602 may be out of round and the generator teeth must track within 1/10 inch to prevent binding and breakage of the gears. To compound the problem the power ring 1602 and generators 1604 may have separate supporting structures with no mechanical linkage between the two. This issue is addressed by tracking the power gears relative position to the generator 1604 and adjusting the generators position to maintain the required clearance. A spring 1618 enables for tension tracking in order to enable movement back and forth of the fixed generator 1604 that is in the engaged position due to out of round conditions of the fixed generator 1604 or the power gear 1602 that are detected. This is controlled by the actuator 1616.

Figure 17:
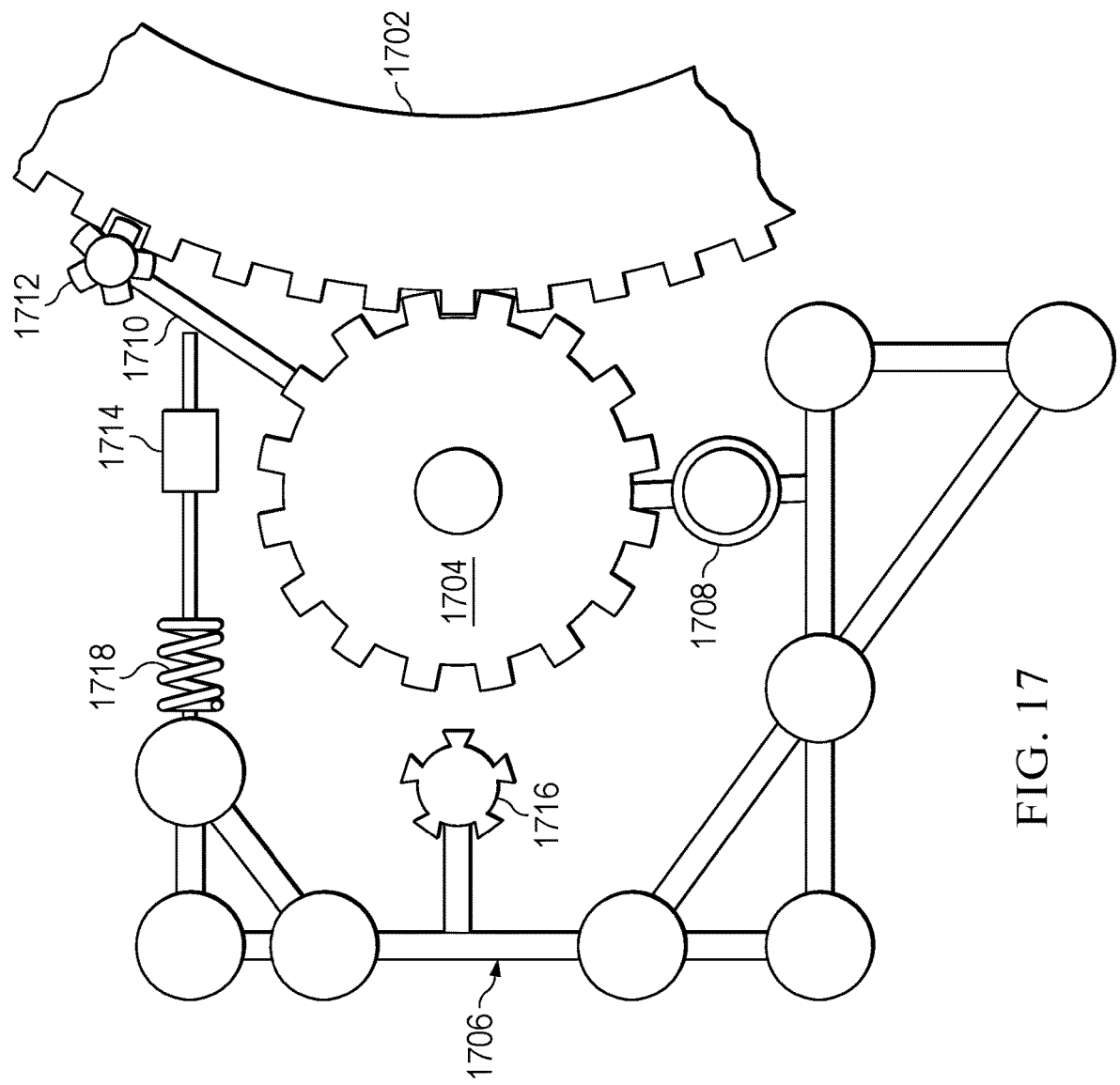
FIG. 17 illustrates a third embodiment of a power generation mechanism associated with a power ring of the VAWT.

Referring now to FIG. 17, there is illustrated a third embodiment of the power generator for use with a VAWT turbine. In this case, the power gear 1702 rotates to provide power to the fixed generator 1704 in a manner similar to that described with respect to FIGS. 15 and 16. The fixed power generator 1704 is again fixed to a support structure 1706 by a hinged pivot connection 1708. In this case, an engagement arm 1710 interconnects the fixed generator 1704 with a tracking gear 1712. The tracking gear 1712 includes teeth that engage the teeth of the power ring 1702. The actuator 1714 moves the fixed generator 1704 between a first position that engages the operation of the generator with the power ring 1702 and a second position that engages the fixed generator 1704 with a spin up motor synchronizer 1716. The spin up motor synchronizer 1716 initiates operation of the fixed generator 1704 when it is in a stopped position. The engagement arm 1710 pivots the fixed generator 1704 on pivot hinge 1708 to have its teeth engage the gear teeth of the spin up motor synchronizer 1716. Once the generator has been sufficiently spun up, the actuator arm 1714 pivots the fixed generator 1704 such that the teeth of the fixed generator 1704 engage the teeth of the power ring 1702. The power ring 1702 may be out of round and the generator teeth must track within 1/10 inches to prevent binding and breakage of the gears. To compound the problem the power ring 1702 and generators 1704 may have separate supporting structures with no mechanical linkage between the two. This issue is addressed by tracking the power gears relative position to the generator 1704 and adjusting the generators position to maintain the required clearance. A spring 1718 enables for tension tracking in order to enable movement back and forth of the fixed generator 1704 that is in the engaged position due to out of round conditions of the fixed generator 1704 or the power gear 1702 that are detected. This is controlled by the actuator 1716.

Figure 18:
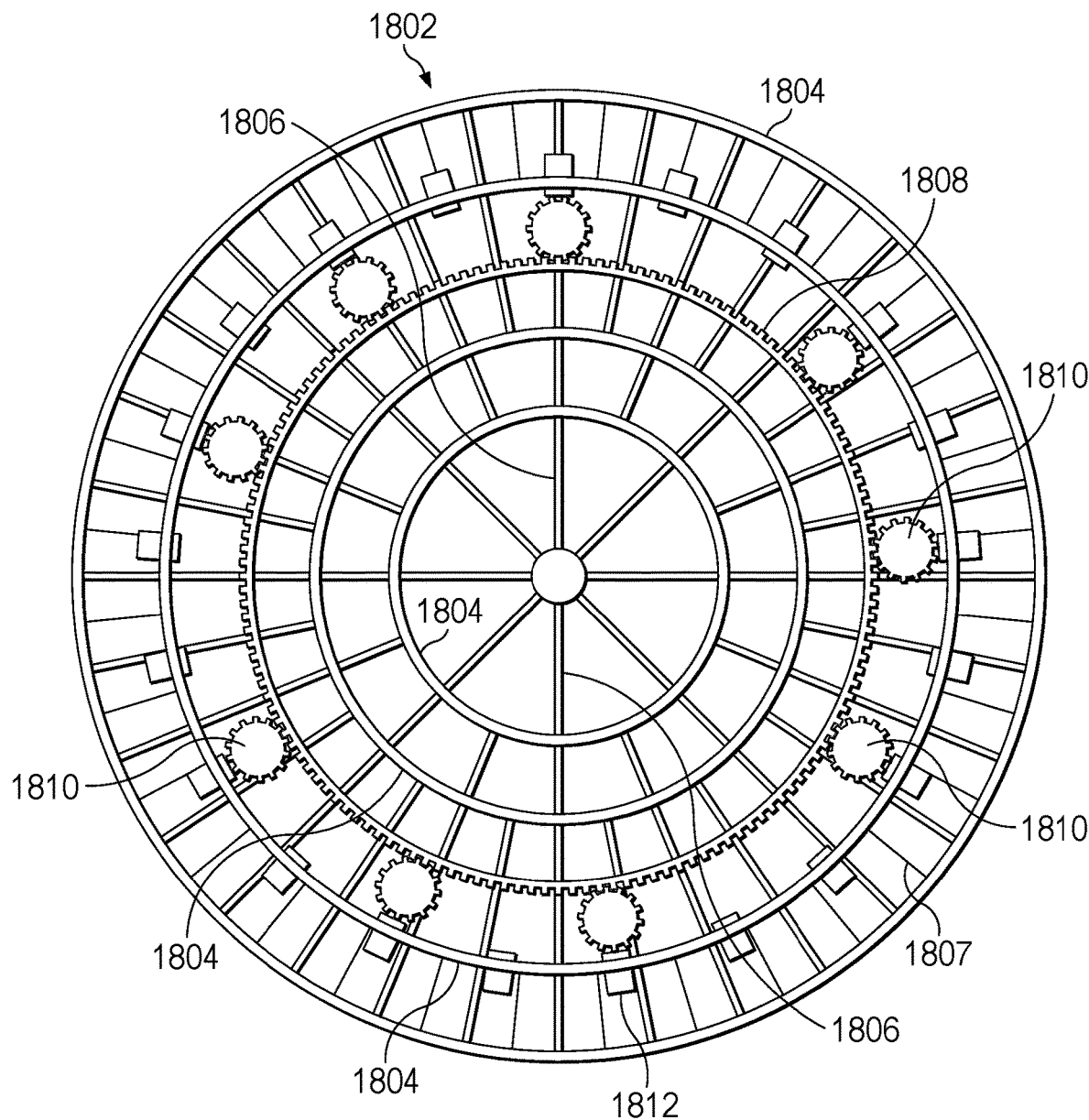
FIG. 18 illustrates the placement of multiple generators with respect to a power ring of a VAWT.

FIG. 18 illustrates a bottom view of a rotor 1802 that includes the power generation circuitry discussed hereinabove with respect to FIGS. 15-17. The rotor support structure includes the support rings 1804 and blade to axle connector 1806. A number of blades 1807 as discussed hereinabove are attached to the support structure. Included in a fixed relationship with the support structure is the power gear 1808. The fixed generators 1810 are placed at various locations around the power gear 1808. Electrical outputs are provided from the various generators 1810 at electrical connections 1812.

In addition to locating generators along a power gear 1808 affixed to the bottom of a rotor, one or more power generators also be included around the central drive axis of the VAWT as more particularly illustrated in FIG. 19. This comprises the indirect power gear via a center power axle 1904 discussed hereinabove. The power gear 1902 and generators 1906 are mounted within a common enclosure (FIG. 20) that mechanically connects the power gear 1902 and generators 1906. (It should be noted that the power gear 1808 could be completely replaced by the power gear 1902 and generators 1906. This eliminates the need for a special tracking hardware to maintain precise tooth clearances of 1/10 of an inch as discussed above. The central axis configuration includes a main power gear 1902 surrounding the central rotational axis of the VAWT. Surrounding the main power gear 1902 are one or more generators 1906 having gears that engage the gears of the main power gear. Rotation of the main power gear 1902 correspondingly actuates power generation by the generators 1906. Additionally, multiple idler gears 1908 can be located between the various generators for stabilizing and controlling the main power gear's lateral movement. The generators 1906 can be engaged or disengaged via a magnetic clutch 1912. This allows generators 1906 to be idled when not in use or when providing maintenance, without stopping the VAWT. Power generated by the various generators is output via an electrical output connection 1910. Magnetic clutch controlled disc brakes 1914 enables the power gear 1902 to be stopped by an associated controller. Indexing motor 1916, engaged via a magnetic clutch, may be used to start rotation of the power gear 1902 when the windmill is stopped or in low or light wind conditions. Furthermore indexing motor 1916 can be used to index the feathered windmill to a new testing and/or maintenance position A 20 foot radius power gear has a circumference of 125 feet. A four-inch generator and/or PTO gear with a circumference of 1 foot increases the windmill's one RPM to a generators 125 RPM. This not only reduces the size of the generator, it also radically reduces the torque and face size of the gears.

FIG. 20 illustrates a side view of two blades 2002 of a rotor connected to a central driveshaft 2004 and associated power circuitry 2006. The central driveshaft 2004 is connected to a power gear 2008. Power gear 2008 rotates with the central driveshaft 2004 to drive one or more generators 2010 connected thereto via associated gears 2012. An indexing motor 2014 may also be included. At times, the VAWT will need to be moved (indexed) to a new position. An electric indexing motor 2014 can be used to index the power gear to a new location. The indexing motor 2014 can move the VAWT to a new service position. At very low wind speeds, by indexing, the computer can start the windmill rotating thereby breaking the generators magnetic lock. During servicing maintenance can continuously index the VAWT while observing if there are any misalignments or if the rollers are skidding instead of rolling. During continuous indexing, all vanes can be observed to continue to swivel enabling tracking alignment with the wind. Using cameras and microphones the computer can index the windmill to record results for remote maintenance processes.

As further shown in FIG. 20, the diameter of the rotor may vary from 100 to 1000 feet depending upon the desired power output. Additionally, the bottom surface of the VAWT should be elevated from 25 to 75 feet for optimum performance. The rotors themselves can typically range from 100 to 375 feet above the ground.

The above described VAWT also provides numerous benefits with respect to wind force recovery. There are numerous examples of required wind force recovery spacing, most examples require 5× to 7× the length of the shortest distance as the minimum object spacing. Examples can be found in square rigged ship sails and windmill to windmill spacings in windfarms. For HAWT 7× the blade rotor's diameter is recommended. For square rigger ship's mast are typically placed 5× of half the sail height and adjust for wind recovery from mast to mast by furling a portion of the sail area, known as trimming the sails, With internal VAWT wind force recovery, the minimum distance of the vanes length or width is a determining factor for spacing of the blades in the direction of rotation. It is believed that 5× is insufficient to produce adequate blade to blade wind recovery based upon empirical testing. This distance may vary with such things as blades/vane patterns. The lack of wind full force recovery is recursive from blade to blade. This compounded recovery losses reflected in the wind energy harvested per windmill volume. With respect to external wind force recovery the wind force will be fully recovered when exiting the windmill. Therefore, no windmill-to-windmill wind force recovery spacing is required.

The VAWT can be mechanically loaded via a computer controlled electrical load center or a programmable friction load. This can be done interactively with or without supplying electricity to the power grid. The purpose of the loading is twofold. Testing of the VAWT performance enables the active testing of the VAWT's performance by applying programmable electrical load points to the generators under known windspeed conditions. In this manner the VAWTs performance can be evaluated. Additionally, the programmable electrical load, per generator 206, can actively test each generator's performance by applying programmable electric load points to known generator RPM speeds. The generator's performance can then be evaluated based upon this information. Additionally, the VAWTs speed and torque can be tested by varying the VAWTs programmable electric load under the same wind conditions. This real time test data can be used to optimizes power when connected to the electrical grid or external load. Controlling the windmill's output supply of electricity can also be used to limit the VAWTs performance as well as test and monitor the vanes Max force trip limit. The controlling computer can use wind speed and direction in its decision-making processes.

Figure 21:
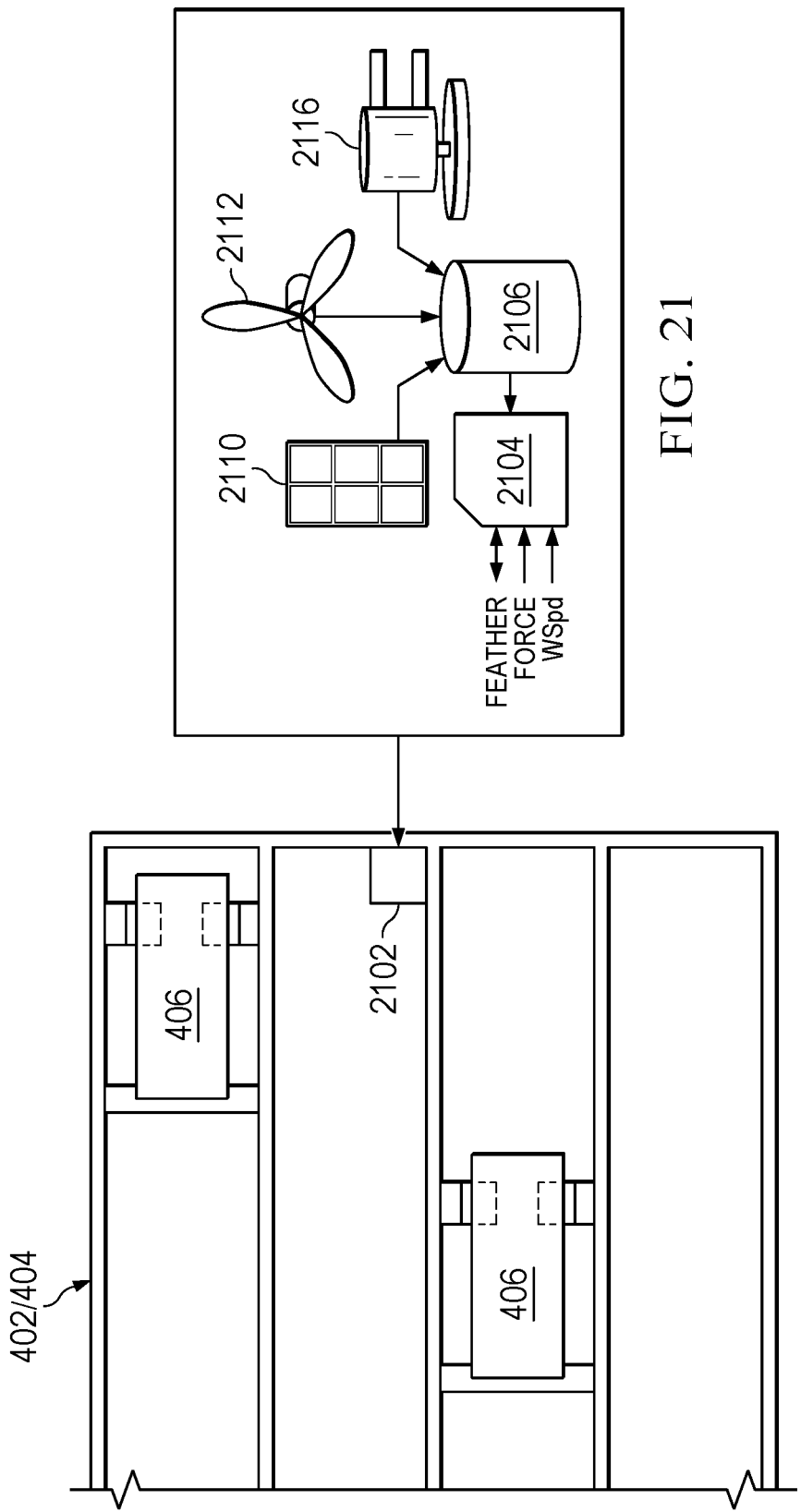
FIG. 21 illustrates a detail of an embodiment for powering the communications and circuitry associated with a particular blade.

Referring now to FIG. 21, there is illustrated a diagrammatic representation of various ways for providing power to a particular blade 402/404 and the associated vanes. There is provided on each of blades 402/404 a power generation block 2102. This power generation block 21 two provides power and communication to each of the vanes 406 and the control operations associated therewith such as a feathering. There is provided in the block 2102 various power generation sources. In addition, there is provided a wireless microcontroller 2104. The microcontroller 2104 is operable to control the feathering operation, receive information regarding the force and information regarding the windspeed. This can be any type of microcontroller. Basically, the microcontroller 2104 contains a processor and various interfaces to sensors and controllers. The microcontroller 2104 contains wireless communications to provide a wireless vacation link for each blade 402/404. Each blade 402/404 will have a unique ID associated with its associated microcontroller 2104.

The microcontroller 2104 is powered by a storage device 2106, which could be a battery, a super capacitor or other type of storage source. Energy is stored in the storage source 2106 by one or more of multiple power generation sources. One source could be a micro solar array 2110, a micro wind generator 2112 disposed on the associated blade 402/404 or an axle generator 2116, which interfaces with the ring 502 in order to generate power when the blade is moving in a rotational matter in response to the presence of wind.

Figure 22:
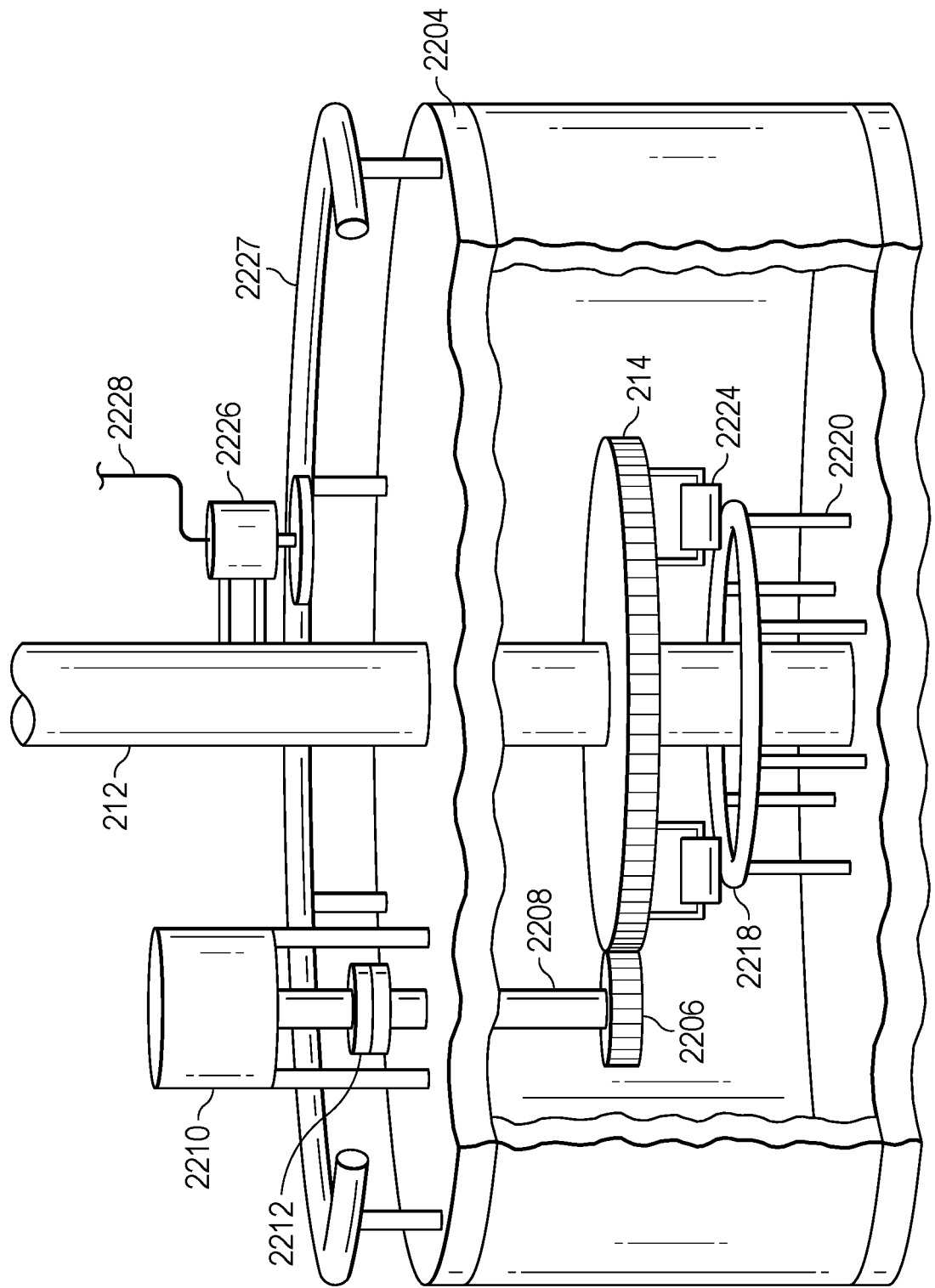
FIG. 22 illustrates a detail of the generation of power.

Referring now to FIG. 22, there is illustrated a diagrammatic view of the power generation for the blades 402/404. The power gear 214 disposed on the pole 212 is disposed below a supporting plate 2204. The upper plate 2204 is fixed relative to rotation of the pole 212 such that the pole 212 rotates in the center thereof with the gear 214 rotating with the pole 212. A takeoff gear 2206 is disposed on the end of an axle 2208 and is operable to interface with a generator 2210 through magnetic clutch 2212. The gear 214 rotates along a gear support ring 2218 that is supported by vertical support standoffs 2220. The gear 214 interfaces with the gear support ring 2218 via rollers 2224.

In this embodiment of FIG. 22, the electric power to each of the vanes is provided by an axle generator 2226 which is fixed to the pole 212 and rotates around the pole 212 interfacing with generator roller surface 2227. Thus, as the pole 212 rotates, power is generated and delivered by the axle generator 2226 along a wire 2228. In this embodiment, the axle generator 2226 provides power to all of the vanes 406 on the various blades 402/404 via a power wire from generator 2226 to each blade 402/404 (via axle 212 via blade connector 1806 to each blade 402/406) to provide power to an associated microcontroller on each of the blades 402/404, as well as, recharging the battery and/or capacitor.

Figure 23:
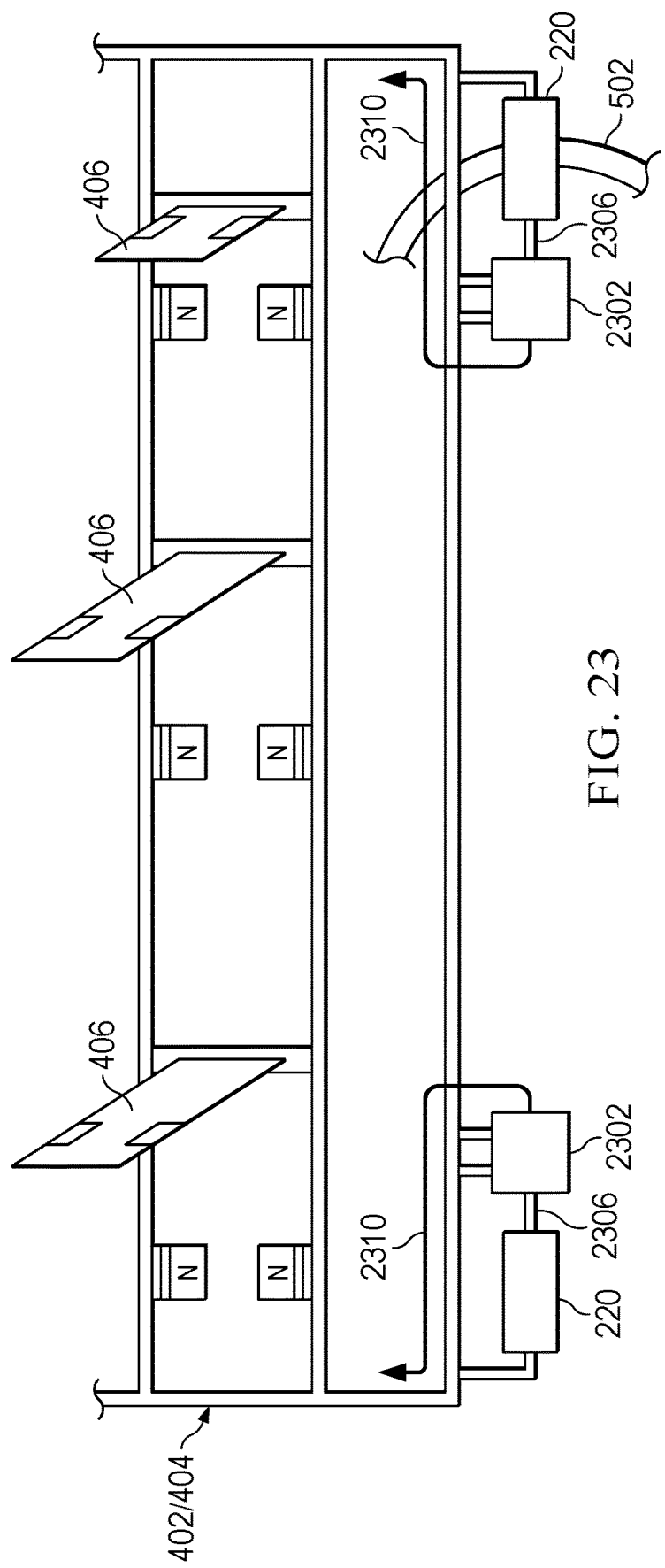
FIG. 23 illustrates an alternate embodiment for power generation to provide power to each vane on a particular blade.

Referring now to FIG. 23, there is a diagrammatic view of an alternate embodiment for generating power for each of the vanes 406 on the respective blades 402/404. In this embodiment, each of the rollers 220 is associated with a respective generator 2302 at either end of the respective blades 402/404. The generators 2302 each interface through an axle 2306 with the associated roller 222 in order to rotate there with. As the roller 220 rolls along the support ring 502, the rotation of the roller 220 is transmitted to the generator 2302 in order to generate power that is transmitted along a wire 2310, which wire 2310 provides all of the power to each of the blades 402/406 in a vertical direction above each other on each of the rotors.

Figure 24:
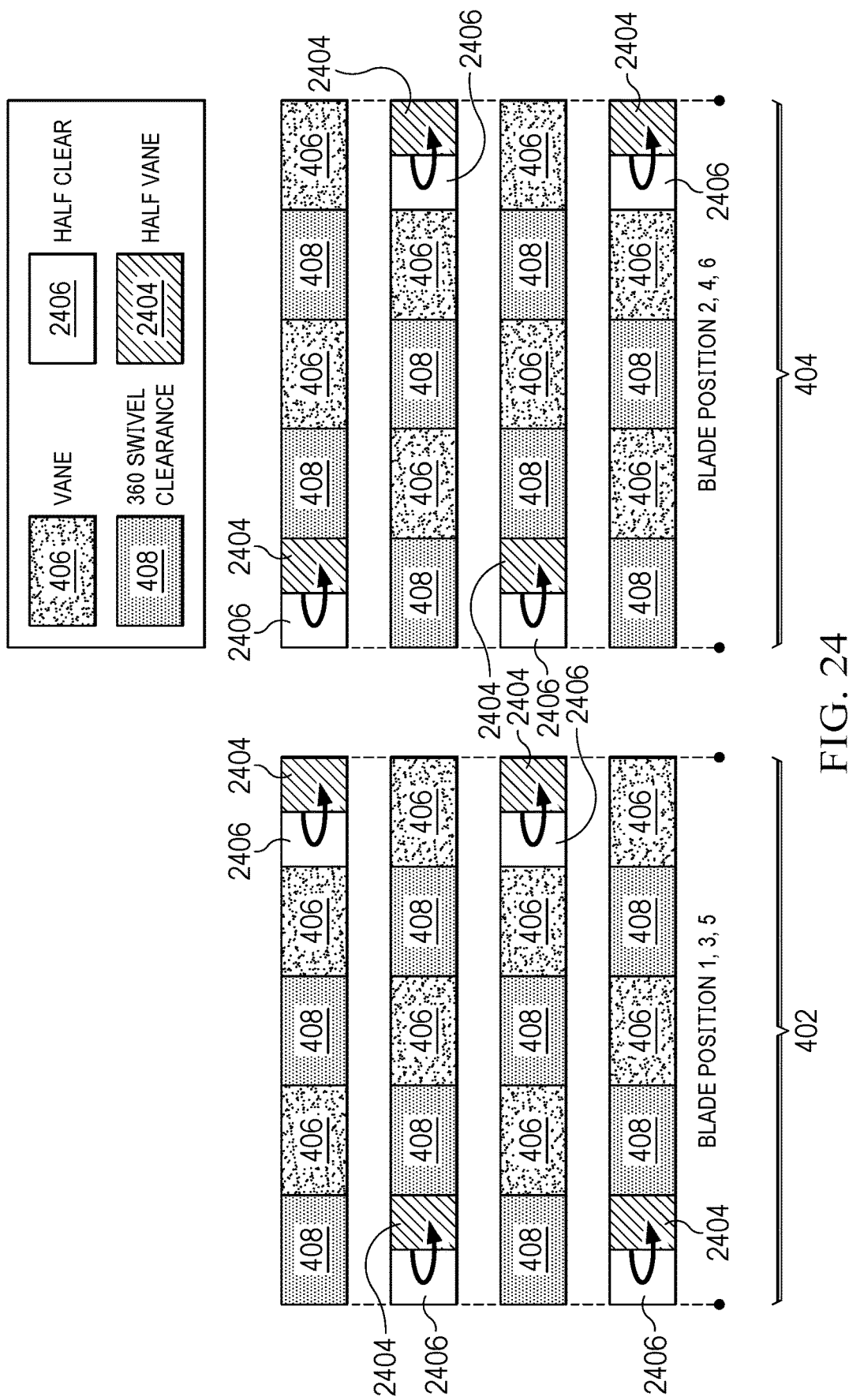
FIG. 24 illustrates an alternate embodiment for the checkerboard pattern of the vanes illustrated above with respect to FIGS. 4A and 4B.

Referring now to FIG. 24, there is illustrated an alternate embodiment to that illustrated above with respect to FIG. 4A. In this embodiment, each of the rows of vanes 406 has one half vane 2404 disposed at either end thereof. For example, on the odd blade 402, there are provided four rows of vanes, the top row having the half vane 2404 disposed on the inner side proximate the pole 212 (not shown), the second row has the half vane 2404 disposed on the outer end thereof, the third row has the half vane 2404 disposed on the inner end thereof and the fourth row has the half vane 2404 disposed on the outer end thereof. This is similar to the configuration of the even blade 404. The clearance for the half vane 2404 will be equal to the width of half vane 2404, this being a clearance 2406. Note that this is the embodiment illustrated in the embodiment of FIG. 4B.

Figure 25:
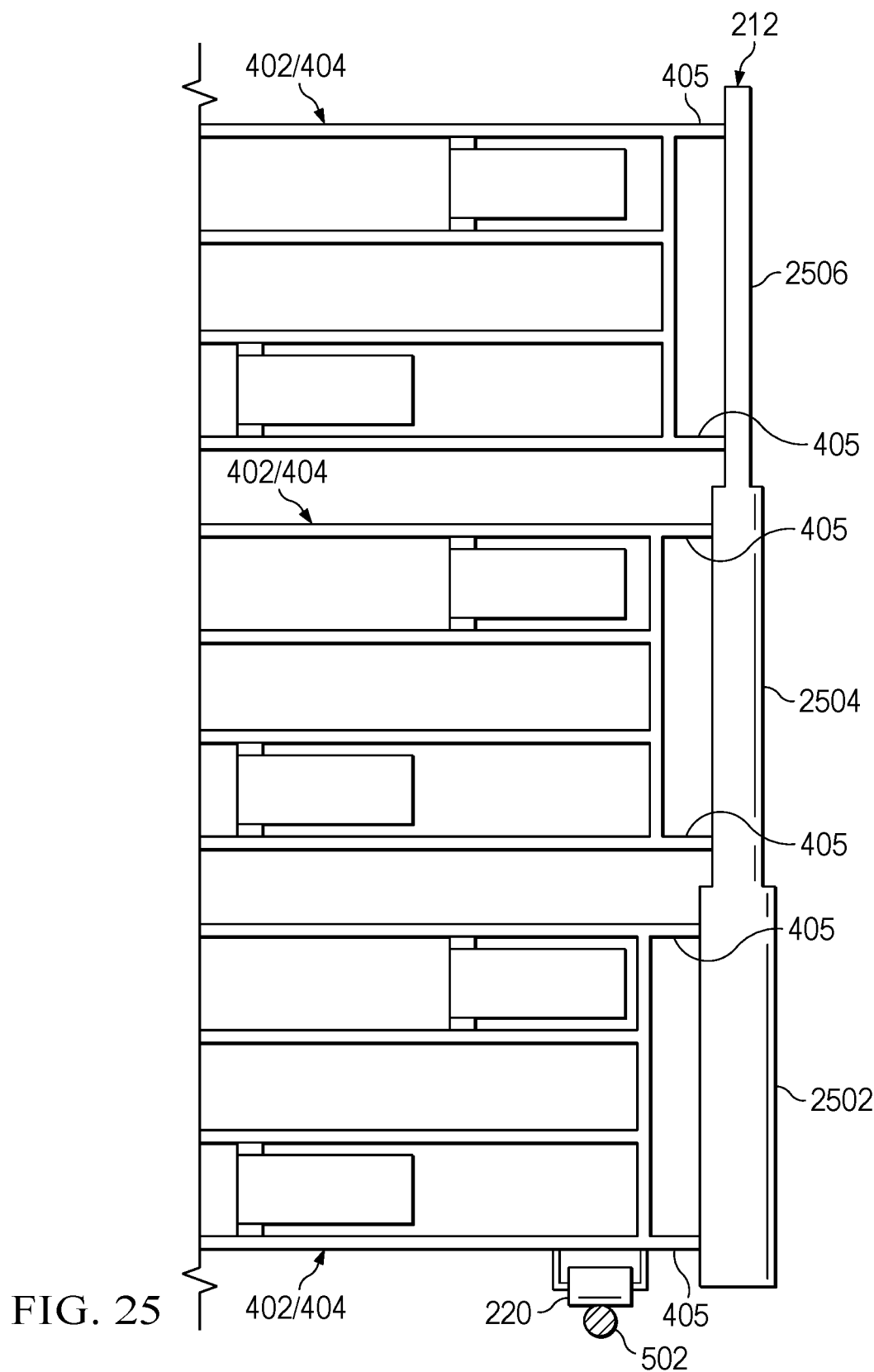
FIG. 25 illustrates a detail of a varying diameter for the center axle, driveshaft.

Referring now to FIG. 25, there is illustrated in an alternate embodiment wherein the pole 212 is configured of successive upward decreasing diameter portions 2502, 2504 and 2506, each one associated with a blade 402/404 connected thereto with the section 405. For the lower blades 402/404, the larger diameter section 2502 is required to absorb the increased torque at the bottom of the rotor stack. At the top thereof for the topmost blade 402/404, less torque is required and, thus, the smaller diameter section 2506 of the pole 212 can be utilized. By using the decreasing diameter sections, the mass of the pole 212 can be decreased.

Figure 26:
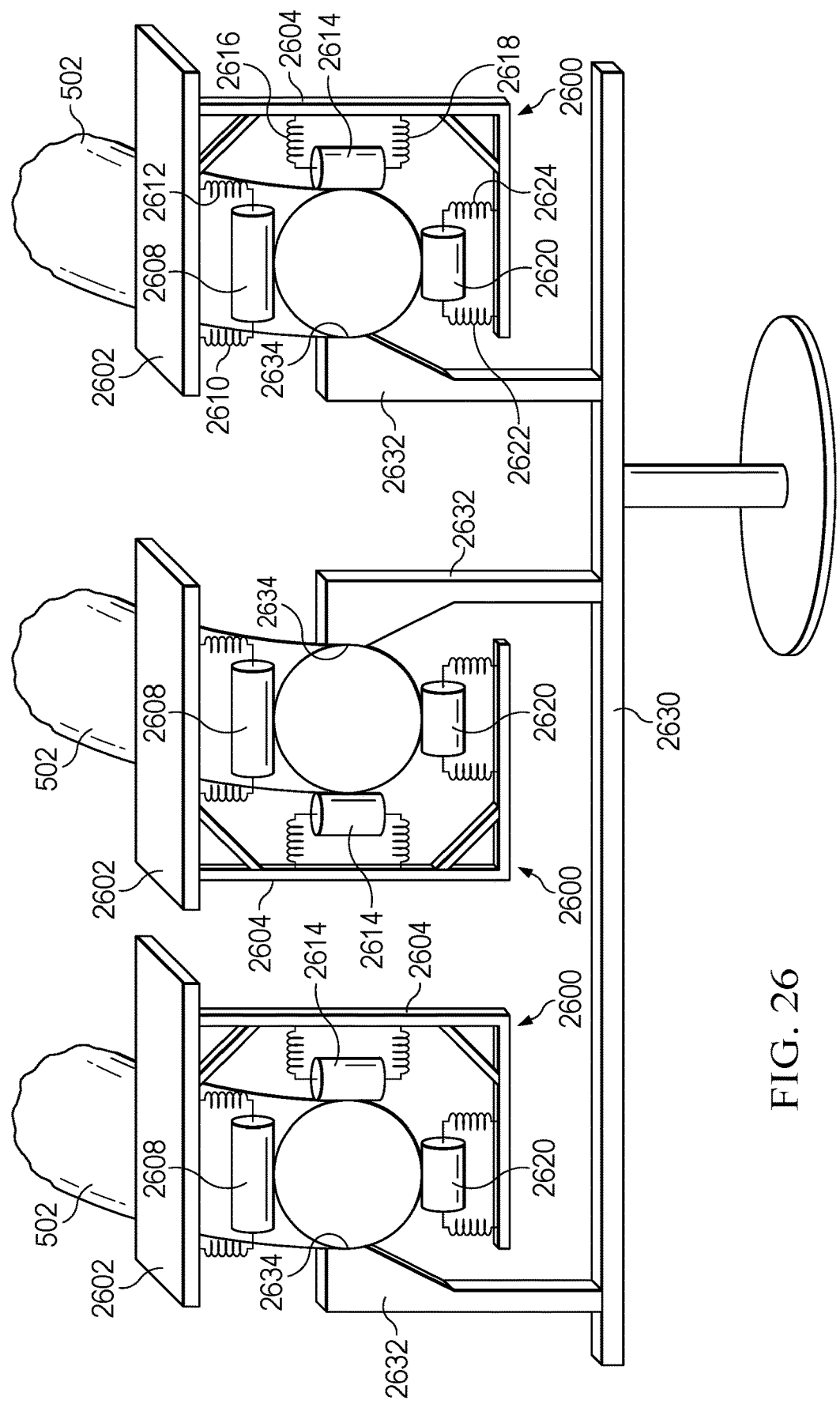
FIG. 26 illustrates a more detailed view of the roller assembly for interfacing each of the blades with the supporting rings.

Referring now to FIG. 26, there is illustrated a cross-sectional view of the interface with each of the blades 402/404 (not shown) with the rings 502. As noted hereinabove, a roller 220 was provided between the bottom surface of each of the blades 402/404 on either end thereof and the rings 502. In the illustration of FIG. 26, the roller 220 is replaced by a roller structure 2600, each roller structure 2600 including a support plate 2602 that is operable to interface with the bottom surface of each of the blades 402/404 on an associated end thereof, there being a roller structure disposed on each end of a blade 402/404. The bottom of the support plate 2602 has a bracket 2604 attached thereto which is a L-shaped bracket. Extending from the bottom surface of the support plate 2602 is an upper roller 2608. This upper roller 2608 is connected on one side thereof to the support plate 2604 with a first spring/shock absorber 2610 and, on the other side thereof, with a spring/shock absorber 2612. In operation, the plate 2602 rests upon the springs/shock absorbers 2610 and 2612 such that the upper roller 2608 can move along the ring 502 with the associated springs/shock absorbers 2610 and 2612 able to absorb vertical movements of the ring 502.

A lateral roller 2614 is provided that is mounted to the vertical surface of the L-shaped bracket 2604. The lateral roller 2614 is attached to the bracket 2604 through a first spring/shock absorber 2616 on one end thereof and a second spring/shock absorber 2618 on the other end thereof and interfaced with a side surface of the ring 502. The lateral roller 2614 is operable to interface between the vertical side of the L-shaped bracket 2604 and the side surface of the ring 502 in order to absorb lateral movement of the ring 502 through the springs/shock absorbers 2616 and 2618.

A bottom roller 2620 is disposed or interfaced with the bottom surface of the L-shaped bracket 2604 and the bottom surface of the ring 502. The bottom roller 2620 is attached to the bottom surface of the L-shaped bracket 2604 on one end thereof by a spring/shock absorber 2622 and on the other end thereof through a spring/shock absorber 2624. The bottom roller 2620 is operable to absorb vertical movements of the ring 502 through the springs/shock absorbers 2622 and 2624. It is noted that each of the rollers 2608, 2614 and 2620 rotates on an axel that is attached to the respective springs/shock absorbers.

With Further reference to FIG. 26, there are illustrated three rings 502, one at 20 feet from the center, one at 40 feet from the center and one at 60 feet from the center. Each of the rings 502 are mounted to a support structure 2630 which could be the ground, or any horizontal support structure, through associated vertical ring supports 2632. It is noted that each of the vertical ring supports 2632 attaches to a lateral side of the associated one of the rings 502 through a connection point 2634. The connection point 2634 is disposed diametrically opposite the associated one of the lateral rollers 2614. The reason for this is that, by connecting to a lateral side of the ring 502, the bottom surface of the blade 402/404 interfaced with the support plate 2602 is free of any encumbrances as the blade 402/404 rotates around and above the supporting rings 502. This allows the lower rollers 2620 to freely move past each of the vertical ring supports 2632 during rotation of the overall structure. The movement of the blades 402/404 over the rings 502 mounted on the plates 2602 operates such that vertical and lateral movement thereof is somewhat restricted but not completely inhibited. If only the upper roller 2608 were provided, it is possible that the entire structure could shift from one side to the other or could actually move upward and jump off of the rings 502. With the lower rollers 2602, this jumping off of the rollers 502 is inhibited and the lateral rollers prevent lateral movement or restrict such.

It can be seen from the illustration of FIG. 26 that the orientation of the L-shaped bracket 2604 alternates for each ring 502 extending from the center of the overall structure. In this manner, as illustrated, the 20 foot ring 502 can have the lateral roller 2614 disposed on the right side thereof and the vertical ring supports 2632 disposed on the left side thereof. The next ring 502, the 40 foot ring 502, has the L-shaped bracket 2604 disposed on the left side thereof with the lateral roller 2614 disposed on the left side thereof with the associated vertical ring support 2632 disposed on the right side thereof. The L-shaped bracket 2604 associated with the 60 foot ring 52 is configured similar to the L-shaped bracket 2604 associated with the 20 foot ring 502. In this manner, for example, if the blade 402/404 were disposed across each of the plates 2602 associated with the 20 foot ring 502 and the 40 foot ring 502, lateral movement of the associated blade 402/404 would, and one direction, compress the springs/shock absorbers 2616 and 2618 for the 20 foot roller 502 and expand the associated springs/shock absorbers 2616 and 2618 for the 40 foot roller 502.

Although the roller configuration for the 60 foot roller 502 is illustrated in the same plane as that for the 20 foot roller and the 40 foot roller, it should be understood that the next adjacent blade would be disposed between the plate 2602 associated with another 40 foot roller 502 and the 60 foot roller 502, as illustrated above with respect to FIG. 5.

Referring now to FIGS. 27-30, there is illustrated an alternative embodiment wherein the vanes will only pivot 180°. The previous embodiments describe the use of vanes that may pivot 360° in one direction and has a power stop in the opposite direction. Under normal operations, when the windmill is turning, this enables formidable drag losses and minimum metal to metal contact to create noise pollution. However, the most violent vane swings occur in both directions when the windmill is stopped for maintenance or other purposes. When the windmill is in a stopped state, for example for maintenance, there is no safe location on the windmill for servicing the vanes by a maintenance worker. One manner for providing a safe workspace is to limit the traveling arc of the vanes to 180°. This then enables workers to ascend/descend the backside of the frames without fear of being struck by a vane. This may be achieved by having an embodiment of a frame 2702 having vanes 2704 that are configured in the manner illustrated in FIG. 27.

Figure 27:
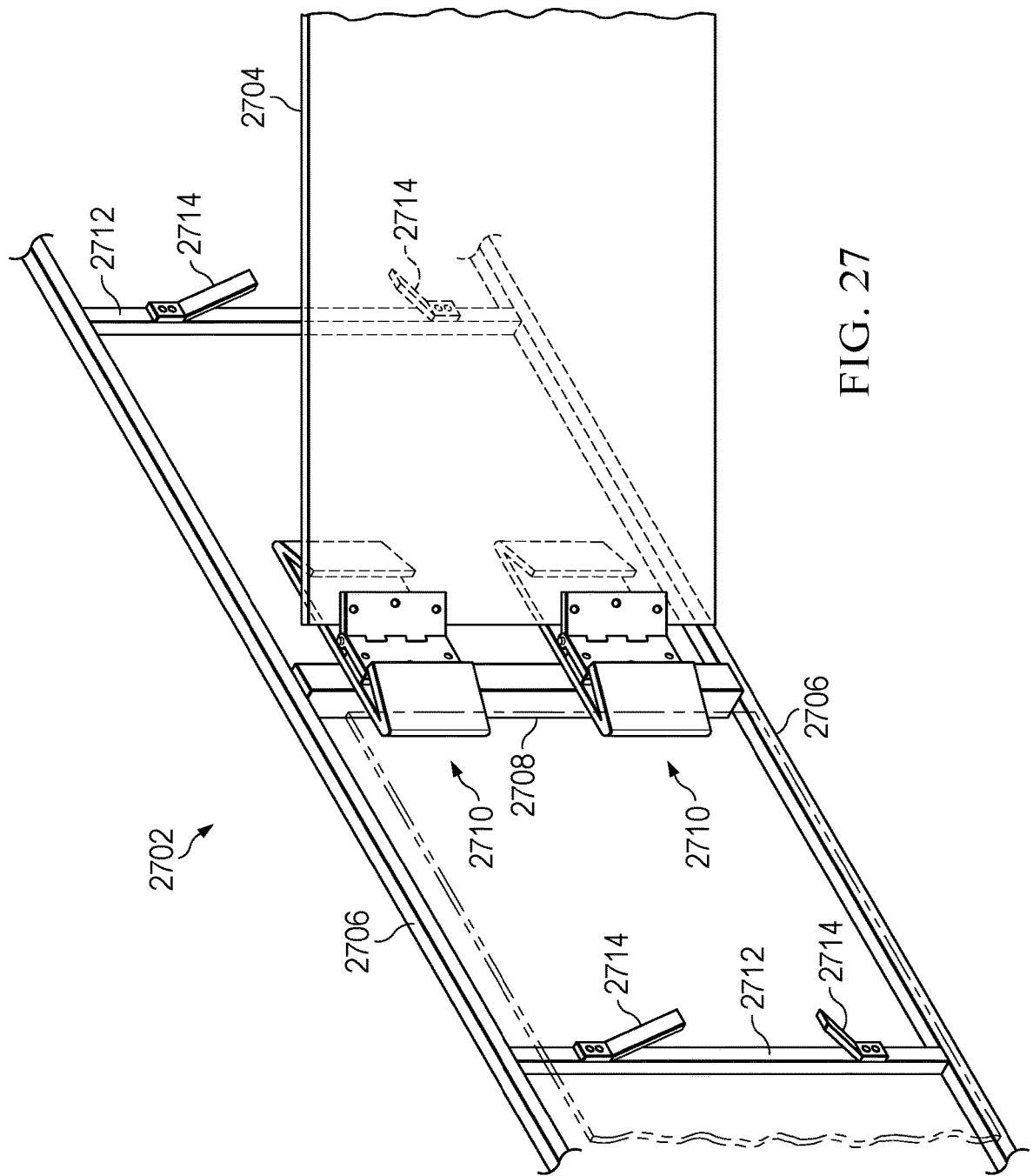
FIG. 27 illustrates a further embodiment of a vane that pivots only 180°.

Referring now to FIG. 27, there is illustrated a section of a frame 2702 having a vane 2704 attached thereto. The vane 2704 is connected between horizontal frame members 2706 to a vertical support member 2708. The vane 2704 connects to the vertical support member 2708 via a pair of leaf spring hinge assemblies 2710. The vane 2704 is limited to a swing angle between 0° and 180° by a pair of stop bars 2712 each having at least one bar stop leaf spring 2714 thereon. Movement of the vane 2704 is slowed and stopped by bar stop leaf spring 2714.

The bar stop leaf spring 2714 extends outwards from stop bar 2712 at an approximately a 30° angle with a length about $\frac{1}{8}^{th}$ the distance to 2704. As vane 2704 makes contact with the spring 2714 at the 30° contact point, the leaf spring folds in the direction aligning with the stop bar, thereby using the stop bar as a limiter. The stop bars 2712 are mounted to allow approximately 10 to 12 inches of the vane 2704 to extend beyond the stop bar. The vane 2704 pivot between each of the stop bars 2712 upon the axis of a hinge pin 2816 of the leaf spring hinge assembly 2710.

Figure 28:
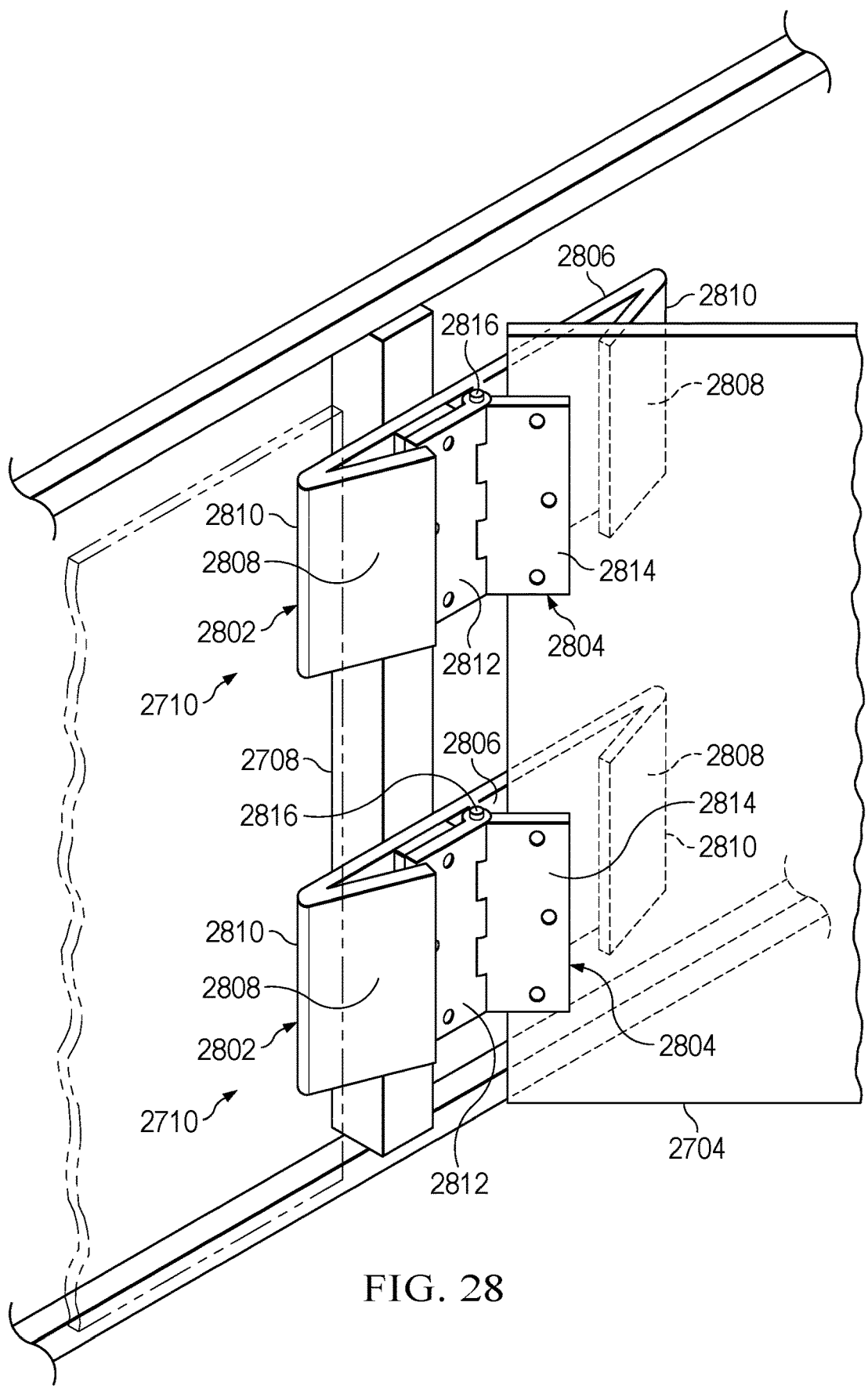
FIG. 28 illustrates the spring hinge assembly of the embodiment of FIG. 27.

Referring now to FIG. 28, there is more particularly illustrated the leaf spring hinge assembly 2710. The leaf spring hinge assembly 2710 includes a leaf spring 2802 and a hinge 2804 for purposes of clarity the vane 2704 is only shown in outline to enable a better view of both sides of the leaf spring hinge assembly 2710. The leaf spring 2802 has a back portion 2806 and two front members 2808. The front members 2808 connect with the back portion 2806 along edges 2810. The connection between the front member 2808 and back portion 2806 enables the front edge 2812 of the front member 2808 two flexibly pivot along the edge 2812 between an open position and a close position. This provides the flexible stopping forces that are applied to the vane 2704 when the vein is opening or closing to one side or the other. The hinge 2804 includes a first leaf portion 2812 that interconnects to the vertical support member 2708 and secures the leaf spring hinge assembly 2710 to the vertical support member. A second leaf portion 2814 of the hinge 2804 is pivotally connected to the first portion 2812 via a hinge pin 2816. The second leaf portion 2814 of the hinge 2804 connects to the vane 2704 and enables the vane 2704 to move between first and second positions at approximately 0° and 180°.

Figure 29:
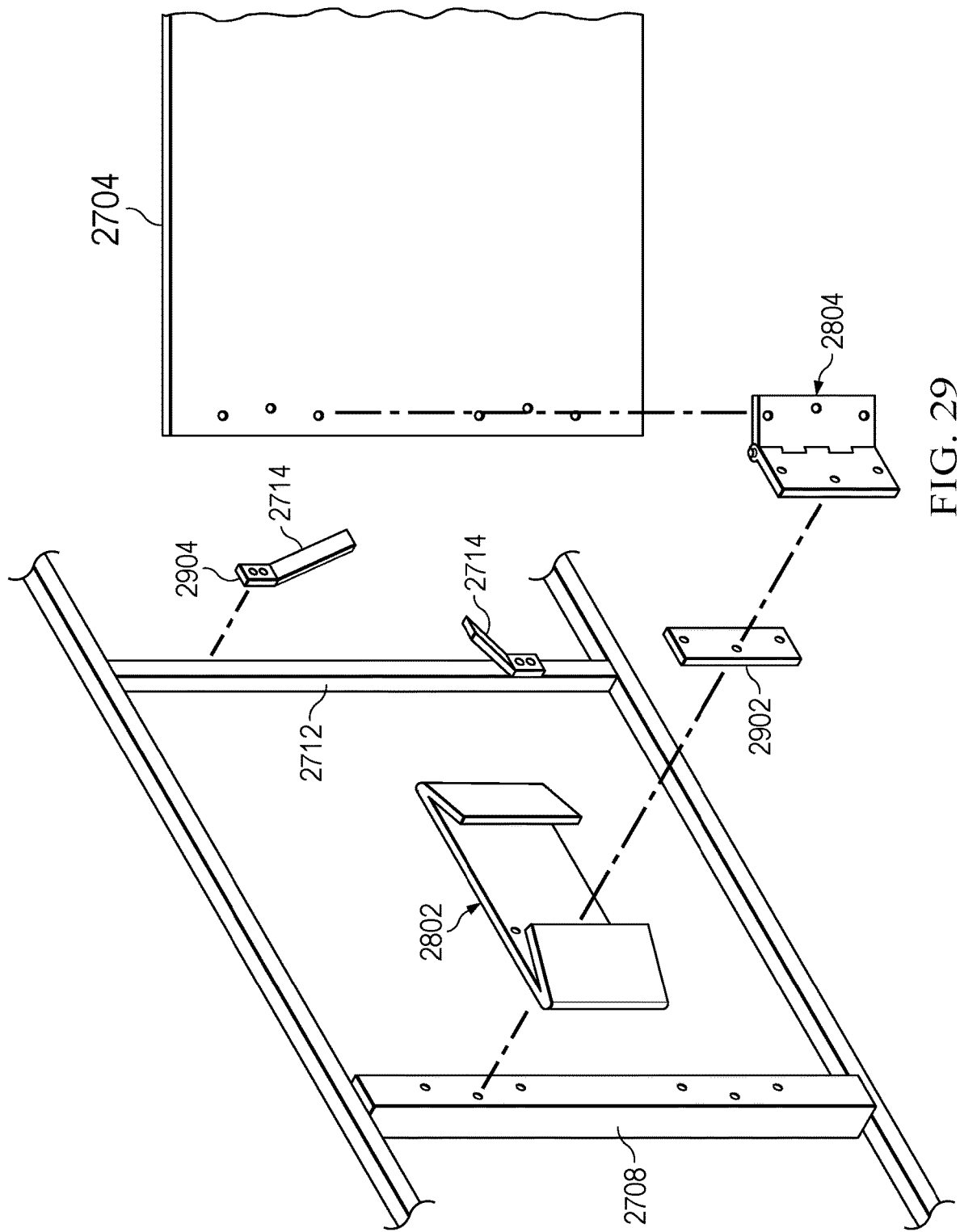
FIG. 29 illustrates an exploded view of the embodiment of FIG. 27.

Referring now to FIG. 29, there is illustrated an exploded view of the components for connecting the vane assembly to the frame 2702. The leaf spring 2802 is secured to the vertical support member 2708 using some type of fastening means such as a screw or bolt. Other types of connection means such as welding could also be utilized. The first leaf portion 2812 of the hinge 2804 is secured to the leaf spring 2802 and vertical support member 2708 using the same fastening means. A spacer 2902 is located between the leaf spring 2802 and first leaf portion 2812 of the hinge 2804. The second leaf portion 2814 of the hinge 2804 is secured to the vane 2704 using a fastening means such as bolts or screws or alternative fastening process such as welding. The vane 2704 may then rotate from approximately 0° to approximately 180° about the central axis of the hinge pin 2804. A pair of bar stop leaf springs 2714 are connected to stop bar 2712 via a mounting bracket 2904. The bar stop leaf spring 2714 and is connected to the stop bar 2712 using some type of fastening means, welding, or bonding process to form a fixed connection. The bar stop leaf springs 2714 may also include some type of cushioning material that when striking the vane 2704 minimizes the noise pollution caused by the collision. The bar stop leaf spring 2714 connect to the stop bar 2712 via a bracket and some type of fastening means, welding, or bonding process to form a fixed connection.

Referring now to FIG. 30A, there is illustrated the movement and forces associated with the vane 2704 pivoting between 0° and 180°. When the vane 2704 moves toward the 0° position against the bar stop leaf spring 2714, the end of the vane 2704 will engage the leaf spring 2802 at a point indicated generally at 3002. There is no leaf spring 2802 contact between 20° and 160°. The biasing force provided by the end of the leaf spring 2802 slows the movement of the vane 2704 by applying a force at point 3002 that slows movement of the vane 2704 as it moves toward the bar stop leaf spring 2714. The vane 2704 is also slowed and stopped by the leaf spring 2714. Similarly, as shown in FIG. 30 B, when the vane 2704 is pivoting to 180°, the vane 2704 will engage the leaf spring 2802 at a point indicated generally by 3004. The biasing forces of the end of the spring 2802 applied at point 3004 will slow movement of the vane 2704 as it moves toward bar stop leaf spring 2714. In each case, the biasing forces of the leaf spring 2802 are caused by the end of the leaf spring that engages the vane 2704 at points 3002 and 3004, respectively to pivot downward while still applying an upward biasing force provided by the leaf spring. The vane 2704 is also slowed and stopped by the leaf spring 2714.

There are two issues that are created by restricting the vane 2704 movement when approaching either the 0° or 180° position. These are noise and drag. Normally when the vane 2714 was opening to 180° from a closed position to an open position, the vane 2704 would slow and halt at the 180° at the stop bar leaf spring 2714. This would provide a major source of mechanical metal contact noise. In order to reduce the opening speed at the joint of the hinge 2804, the leaf spring 2802 comes into contact with the hinge 2804 at approximately 160° to begin slowing of the traveling speed of the vane. At approximately 170°, the vane 2704 comes into contact with the leaf spring 2802 and brings the vane to a stop prior to hitting the stop bar 2712. The leaf spring 2802 makes contact with the hinge 2804 prior to the 180° vane position becoming a source of increased drag. Therefore, the contact of the leaf spring 2002 at 160° is a trade-off between noise and drag.

With respect to closing noise, a similar contact is made with the leaf spring 2802 and the vane 2704 at approximately 20° and the bar is stopped at 10° when the vane 2704 is moving to a closed position. Closing of the vane 2704 normally only occurs when the windmill is stopped and in gusting wind conditions. Any added wind profile to the frame between 180° and 360° will increase drag. Any leaf spring contact during the 180° to 360° return will also increase drag. Thus, there is no leaf spring contact between 200° and 340°.

It will be appreciated by those skilled in the art having the benefit of this disclosure that this vertical axis wind turbine provides an improved manner of wind generation. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

By way of example: separating the leaf spring hinge 2802 and mounting each at separate locations alone the vertical support member 2708.

What is claimed is:

1. A vertical axis windmill turbine, comprising:
   a support structure for supporting the vertical axis windmill turbine above ground level;
   at least one rotor for rotating upon the support structure, the at least one rotor comprising a horizontal structure having a rotational axis perpendicular to the ground level;
   a plurality of blades positioned within each of the at least one rotor for causing the at least one rotor to rotate on the support structure responsive to wind force;
   a plurality of vanes located on each of the plurality of blades, the plurality of vanes rotating between an open position to limit drag on the at least one rotor and a closed position that provides a rotational force to the at least one rotor, the plurality of vanes rotating between the open position and the closed position responsive to a wind force, wherein an angle between the open position and the closed position comprises approximately 180 degrees;
   a plurality of hinges, each of the hinges connecting a vane of the plurality of vanes to a blade of the plurality of blades, wherein the plurality of hinges have a biasing force applied thereto to slow movement of the connected vane when approaching 0 degrees and 180 degrees, respectively; and
   a plurality of vane stops associated with each of the plurality of blades to prevent the vane from moving past approximately 0° and approximately 180°.

2. The vertical axis windmill turbine of claim 1, wherein each of the plurality of hinges further comprises a leaf spring connecting a structure of the blade with the vane, the leaf spring applying a first biasing force when the vane pivots toward 0° to stop the movement of the vane and applying a second biasing force when the vane pivots toward 180° to stop the movement of the vane.

3. The vertical axis windmill turbine of claim 2 further comprising a spacer located between each of the plurality of hinges and the leaf spring associated with each of the plurality of hinges.

4. The vertical axis windmill turbine of claim 1, wherein the plurality of vanes further comprises:
   a first stop bar associated with each of the plurality of vanes, the first stop bar located along the vane at a predetermined distance from an end of the blade at a 0° position of the vane; and a second stop bar associated with each of the plurality of vanes, the second stop bar located along the vane at a predetermined distance from an end of the blade at a 180° position of the vane.

5. The vertical axis windmill turbine of claim 4 further comprising at least one of the plurality of vane stops associated with each of the first and second stop bars for stopping movement of the vane.

6. The vertical axis windmill turbine of claim 5, wherein the at least one of the plurality of vane stops comprises a cushion material to limit noise when the vane impacts the at least one of the plurality of vane stops.

7. A blade structure for use with a vertical axis windmill turbine, comprising:
   a blade support structure;
   a plurality of vanes located on the blade support structure, the plurality of vanes rotating between an open position and a closed position responsive to a wind force, wherein an angle between the open position and the closed position comprises approximately 180°;
   a plurality of hinges, each of the hinges connecting a vane of the plurality of vanes to a blade of a plurality of blades, wherein the plurality of hinges have a biasing force applied thereto to slow movement of the connected vane when approaching 0° and 180°; and
   a plurality of bar stop leaf springs associated with each of the plurality of blades to prevent the vane from moving past approximately 0° and approximately 180°.

8. The vertical axis windmill turbine of claim 7, wherein each of the plurality of hinges further comprises a leaf spring connecting a structure of the blade with the vane, the leaf spring applying a first biasing force when the vane pivots toward 0° to stop the movement of the vane and applying a second biasing force when the vane pivots toward 180° to stop the movement of the vane.

9. The vertical axis windmill turbine of claim 8 further comprising a spacer located between each of the plurality of hinges and the leaf spring associated with each of the plurality of hinges.

10. The vertical axis windmill turbine of claim 7, wherein the plurality of vanes further comprises:
    a first stop bar associated with each of the plurality of vanes, the first stop bar located along the vane at a predetermined distance from an end of the blade at a 0° position of the vane; and
    a second stop bar associated with each of the plurality of vanes, the second stop bar located along the vane at a predetermined distance from an end of the blade at a 180° position of the vane.

11. The vertical axis windmill turbine of claim 10 further comprising at least one of the plurality of bar stop leaf springs associated with each of the first and second stop bars for stopping movement of the vane.

12. The vertical axis windmill turbine of claim 11, wherein the at least one of the plurality of bar stop leaf springs comprises a cushion material to limit noise when the vane impacts the at least one of the plurality of bar stop leaf springs.

13. A vertical axis windmill turbine, comprising:
    a support structure for supporting the vertical axis windmill turbine above ground level;
    at least one rotor for rotating upon the support structure, the at least one rotor comprising a horizontal structure having a rotational axis perpendicular to the ground level;
    a plurality of blades positioned within each of the at least one rotor for causing the at least one rotor to rotate on the support structure responsive to wind force;
    a plurality of vanes located on each of the plurality of blades, the plurality of vanes rotating between an open position and a closed position responsive to a wind force, wherein an angle between the open position and the closed position comprises approximately 180°;
    a plurality of hinges, each of the hinges connecting a vane of the plurality of vanes to a blade of the plurality of blades, wherein the plurality of hinges have a biasing force applied thereto to slow movement of the connected vane when approaching a 0° position and 180° position;
    wherein each of the plurality of hinges further comprises a leaf spring connecting a structure of the blade with the vane, the leaf spring applying a first biasing force when the vane pivots toward the 0° position to stop the movement of the vane and applying a second biasing force when the vane pivots toward the 180° position to stop the movement of the vane;
    wherein the plurality of vanes further comprises:
       a first stop bar associated with each of the plurality of vanes, the first stop bar located along the vane at a predetermined distance from an end of the blade at the 0° position of the vane; and
       a second stop bar associated with each of the plurality of vanes, the second stop bar located along the vane at a predetermined distance from an end of the blade at the 180° position of the vane;
    a plurality of vane stops associated with each of the first stop bar to prevent the vane from moving past approximately 0° and the second stop bar to prevent the vane from moving past approximately the 180° position.

14. The vertical axis windmill turbine of claim 13 further comprising a spacer located between each of the plurality of hinges and the leaf spring associated with each of the plurality of hinges.

15. The vertical axis windmill turbine of claim 13 further comprising at least one of the plurality of vane stops associated with each of the first and second stop bars for stopping movement of the vane.

16. The vertical axis windmill turbine of claim 15, wherein the at least one of the plurality of vane stops comprises a leaf spring.

* * * * *